(12) United States Patent
Fujii et al.

(10) Patent No.: US 7,209,706 B2
(45) Date of Patent: Apr. 24, 2007

(54) COMMUNICATION APPARATUS AND COMMUNICATION METHOD

(75) Inventors: Kunihide Fujii, Tokyo (JP); Tadashi Morita, Tokyo (JP); Shigeru Arisawa, Tokyo (JP); Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 10/715,447

(22) Filed: Nov. 19, 2003

(65) Prior Publication Data

US 2004/0116074 A1  Jun. 17, 2004

(30) Foreign Application Priority Data

Dec. 17, 2002 (JP) ............................. 2002-364746

(51) Int. Cl.
*H04B 7/00* (2006.01)
(52) U.S. Cl. .................. 455/41.2; 455/88; 342/42; 342/44
(58) Field of Classification Search ............. 455/41.2, 455/88, 410; 342/42, 44, 50
See application file for complete search history.

(56) References Cited

U.S. PATENT DOCUMENTS

| | | | |
|---|---|---|---|
| 5,317,309 A | 5/1994 | Vercellotti et al. | |
| 5,349,649 A | 9/1994 | Iijima | |
| 5,500,650 A * | 3/1996 | Snodgrass et al. | 342/42 |
| 5,602,538 A | 2/1997 | Orthmann et al. | |
| 6,067,291 A | 5/2000 | Kamerman et al. | |
| 6,097,292 A | 8/2000 | Kelly et al. | |
| 6,782,241 B2 * | 8/2004 | Kobayashi | 455/88 |
| 2002/0011921 A1 | 1/2002 | Amtmann | |
| 2002/0063622 A1 | 5/2002 | Armstrong et al. | |
| 2002/0132584 A1 * | 9/2002 | Izumi | 455/41 |

FOREIGN PATENT DOCUMENTS

| | | |
|---|---|---|
| EP | 0 513 507 | 11/1992 |
| EP | 0 694 860 | 1/1996 |
| EP | 0 923 054 | 6/1999 |
| EP | 1 001 366 | 5/2000 |
| EP | 1 211 630 | 6/2002 |
| GB | 2 333 623 | 7/1999 |
| JP | 4-321192 | 11/1992 |
| JP | 6-502249 | 3/1994 |
| JP | 07-296125 | 11/1995 |
| JP | 8-62327 | 3/1996 |
| JP | 11-163897 | 6/1999 |

(Continued)

*Primary Examiner*—Sanh D. Phu
(74) *Attorney, Agent, or Firm*—Oblon, Spivak, McClleland, Maier & Neustadt, P.C.

(57) ABSTRACT

A communication apparatus and a communication method prevent responses from being simultaneously received from two or more communicating parties. A first NFC apparatus transmits data for requesting IDs, and acquires IDs sent from second and third NFC apparatuses in reply to the request. After acquiring the IDs of the second and third NFC apparatuses, the first NFC apparatus transmits data that includes their IDs as the data for the second and third NFC apparatuses. If the first NFC apparatus cannot properly acquire the IDs of the second and third NFC apparatuses, then it sends the data for requesting their IDs again. Upon receipt of the request for the IDs, the second and third NFC apparatuses generate their own IDs by using random numbers and send the generated IDs. If the second and third NFC apparatuses receive the request for their IDs again, then they re-generate their own IDs by using random numbers, and send the re-generated IDs again. The present invention can be applied to, for example, an IC card system.

10 Claims, 23 Drawing Sheets

FOREIGN PATENT DOCUMENTS

| | | |
|---|---|---|
| JP | 11-167610 | 6/1999 |
| JP | 2000-172806 | 6/2000 |
| JP | 2001-126037 | 5/2001 |
| JP | 2001-126038 | 5/2001 |
| JP | 2001-344582 | 12/2001 |
| JP | 2002-204200 | 7/2002 |
| JP | 2002-353852 | 12/2002 |
| JP | 2003-150916 | 5/2003 |
| JP | 2003-188805 | 7/2003 |
| JP | 2004-200840 | 7/2004 |
| JP | 2004-200841 | 7/2004 |
| JP | 2004-215225 | 7/2004 |
| JP | 2005-168069 | 6/2005 |
| JP | 2005-204331 | 7/2005 |
| JP | 2005-210741 | 8/2005 |

* cited by examiner

FIG. 2
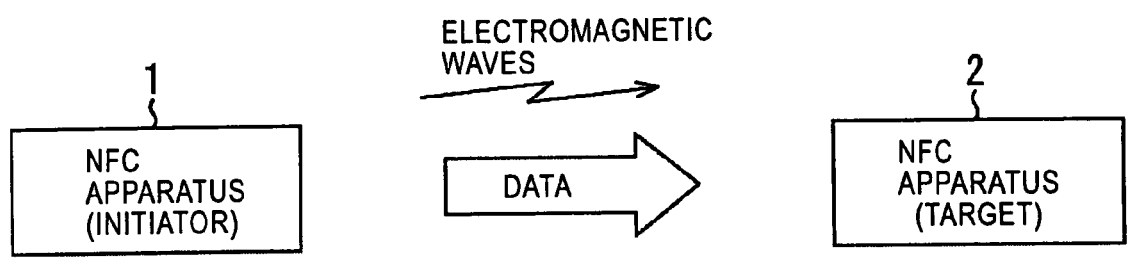
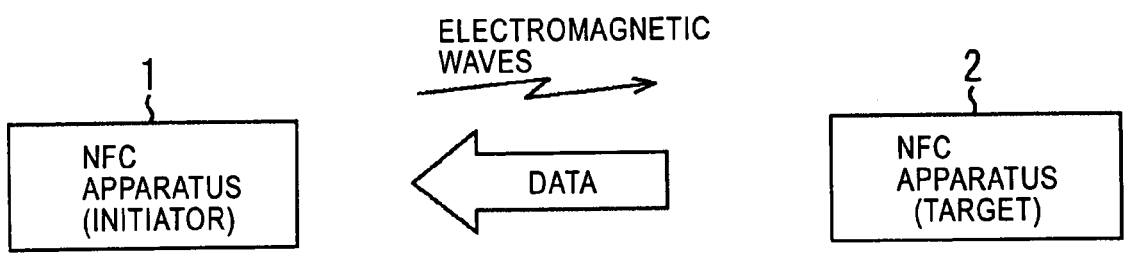

FIG. 3
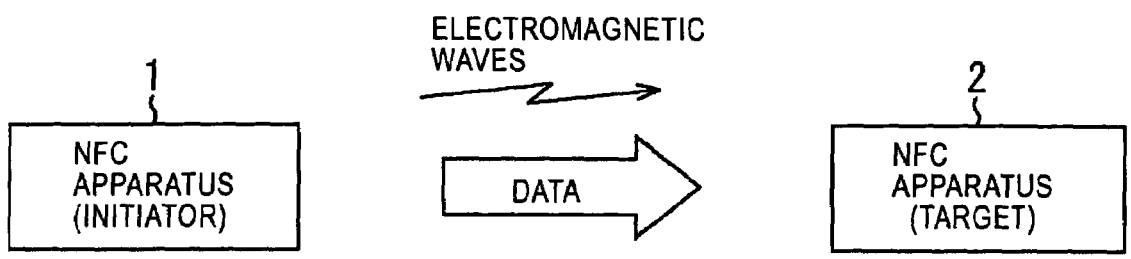
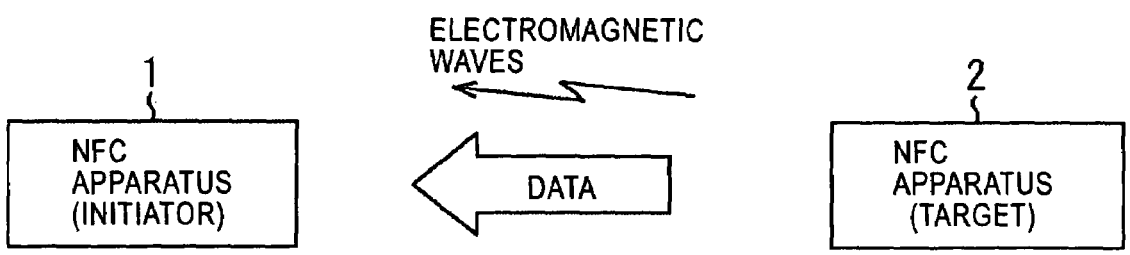

$T_{IDT}$: Initial delay time. $T_{IDT} > 4\,096/f_c$
$T_{RFW}$: RF waiting time. $512/f_c$
n: randomly generated number of Time Periods for $T_{RFW}$.
$0 \leq n \leq 3$
$T_{IRFG}$: Initial guard-time between switching on RF field and start to send command or data frame.
$T_{IRFG} > 5$ ms $T_{ADT}$: Active delay time, sense time between RF off Initiator/Target and Target/Initiator
        (768/fc ≤ $T_{ADT}$ ≤ 2 559/fc)
$T_{RFW}$: RF waiting time. (512/fc)
n: Randomly generated number of Time Periods for $T_{RFW}$. (0 ≤ n ≤ 3)
$T_{ARFG}$: Active guard time between switching on RF field and start to send command. ($T_{ARFG}$ >1024/fc)

FIG. 12

| COMMAND/RESPONSE |
|---|
| ATR_REQ |
| ATR_RES |
| WUP_REQ |
| WUP_RES |
| PSL_REQ |
| PSL_RES |
| DEP_REQ |
| DEP_RES |
| DSL_REQ |
| DSL_RES |
| RLS_REQ |
| RLS_RES |

COMMUNICATION APPARATUS AND COMMUNICATION METHOD

BACKGROUND OF THE INVENTION

1. Field of the Invention

The present invention relates to a communication apparatus and a communication method and more particularly to a communication apparatus and a communication method that allow a plurality of communicating parties to be individually identified with accuracy so as to prevent responses from being simultaneously received from two or more communicating parties in, for example, near field communication or the like.

2. Description of the Related Art

As a system used for the near field communication, an integrated circuit (IC) system, for example, is widely known. In an IC card system, a reader/writer generates electromagnetic waves to form a so-called radio frequency (RF) field or a magnetic field. When an IC card is brought close to the reader/writer, power is supplied to the IC card by electromagnetic induction and data is transferred to and from the reader/writer.

The IC card systems currently available come in, for example, type A, type B and type C.

Type A adopts the Philips' MIFARE system. Data encoding by Miller is performed for the transmission of data from a reader/writer to an IC card, while data encoding by Manchester is performed for the transmission of data from the IC card to the reader/writer. Type A uses a data transmission rate of 106 kbps (kilo bits per second).

In Type B, data encoding based on NRZ is performed for the transmission of data from a reader/writer to an IC card, while data encoding based on NRZ-L is performed for the transmission of data from the IC card to the reader/writer. Type B uses a data transmission rate of 106 kbps.

Type C is based on the FeliCa technology developed by Sony Corporation, which is the assignee of the present application. Data encoding by Manchester is performed for the transmission of data between a reader/writer and an IC card. Type C uses a data transmission rate of 212 kbps (kilo bits per second).

In an IC card system, when a plurality of IC cards are brought closely to a single reader/writer, the reader/writer is required to identify each of the IC cards so as to identify each communicating party when performing communication.

A method is available for identifying a plurality of IC cards by assigning unique identification numbers (hereinafter referred to as IDs) to the IC cards and have the IDs reported from the IC cards to the reader/writer.

If unique IDs are assigned to the IC cards, as in the case described above, then the IDs will not be overlapped among IC cards. In this case, however, memories, such as electrically erasable programmable read only memories (EEPROMs), are required to always store the unique IDs. This means that the IC cards must be provided with EEPROMs to store their IDs even when the EEPROMs are not necessary, disadvantageously resulting in higher manufacturing cost.

As a solution to the above problem, a method is available in which random numbers are generated in the IC cards and the generated random numbers are temporarily used as their IDs. This method obviates the need for always storing the IDs and therefore obviates the need for providing them with the EEPROMs for storing IDs.

However, if random numbers are used for the IDs, then the same random numbers may be used as the IDs by a plurality of IC cards. If this happens, when a reader/writer transmits data on the basis of the ID, a plurality of IC cards simultaneously responds, causing a collision to take place. This prevents the reader/writer from properly receiving the responses from the IC cards.

SUMMARY OF THE INVENTION

Accordingly, the present invention has been made in view of the above, and it is an object thereof to securely identify each of a plurality of communicating parties and to prevent responses from being simultaneously received from two or more communicating parties.

To this end, a first communication apparatus in accordance with the present invention sends data for requesting an identification (ID) for identifying other apparatus, and acquires the ID sent by the other apparatus in response to the request for the ID. After acquiring the ID of the other apparatus, the communication apparatus sends data that includes the ID of the other apparatus as the data for the other apparatus. If the communication apparatus cannot properly acquire the ID of the other apparatus, it resends data for requesting the ID.

In a first communication method according to the present invention, data for requesting the ID for identifying other apparatus is sent, and the ID sent by the other apparatus in response to the request for the ID is acquired. After acquiring the ID of the other apparatus, the data that includes the ID of the other apparatus is sent as the data for the other apparatus. If the ID of the other apparatus fails to be properly acquired, then the data for requesting the ID is resent.

A second communication apparatus in accordance with the present invention generates the ID of other apparatus by using a random number when the data for requesting the ID for identifying itself is received from the other apparatus. When the data for requesting the ID is received again from the other apparatus, the communication apparatus re-generates its ID by using a random number and resends the re-generated ID. The communication apparatus receives the data including its ID among the data sent from the other apparatus as the data for itself.

In a second communication method according to the present invention, when data for requesting the ID for identifying itself is received from other apparatus, its ID is generated using a random number and the generated ID is sent. When data for requesting ID is received again from the other apparatus, its ID is generated again by using a random number and the re-generated ID is sent again. The data that includes its ID among the data transmitted from the other apparatus is received as the data for itself.

According to the first communication apparatus and the first communication method in accordance with the present invention, data for requesting the ID for identifying other apparatus is sent, and the ID sent from the other apparatus in response to the request for the ID is acquired. After the ID of the other apparatus is acquired, the data that includes the ID of the other apparatus is sent as the data for the other apparatus. If the ID of the other apparatus cannot be properly acquired, then the data for requesting the ID is sent again.

According to the second communication apparatus and the second communication method, when the data for requesting the ID for identifying itself is received from other apparatus, its ID is generated by using a random number and the generated ID is sent out. When the data for requesting the ID is received again from the other apparatus, its ID is re-generated by using a random number and the re-generated ID is resent. The data that includes its ID among the data sent from the other apparatus is received as the data for itself.

BRIEF DESCRIPTION OF THE DRAWINGS

FIG. 2 is a diagram for explaining a passive mode;

FIG. 3 is a diagram for explaining an active mode;

FIG. 12 is a list of commands and responses;

DESCRIPTION OF THE PREFERRED EMBODIMENTS

Figure 1:
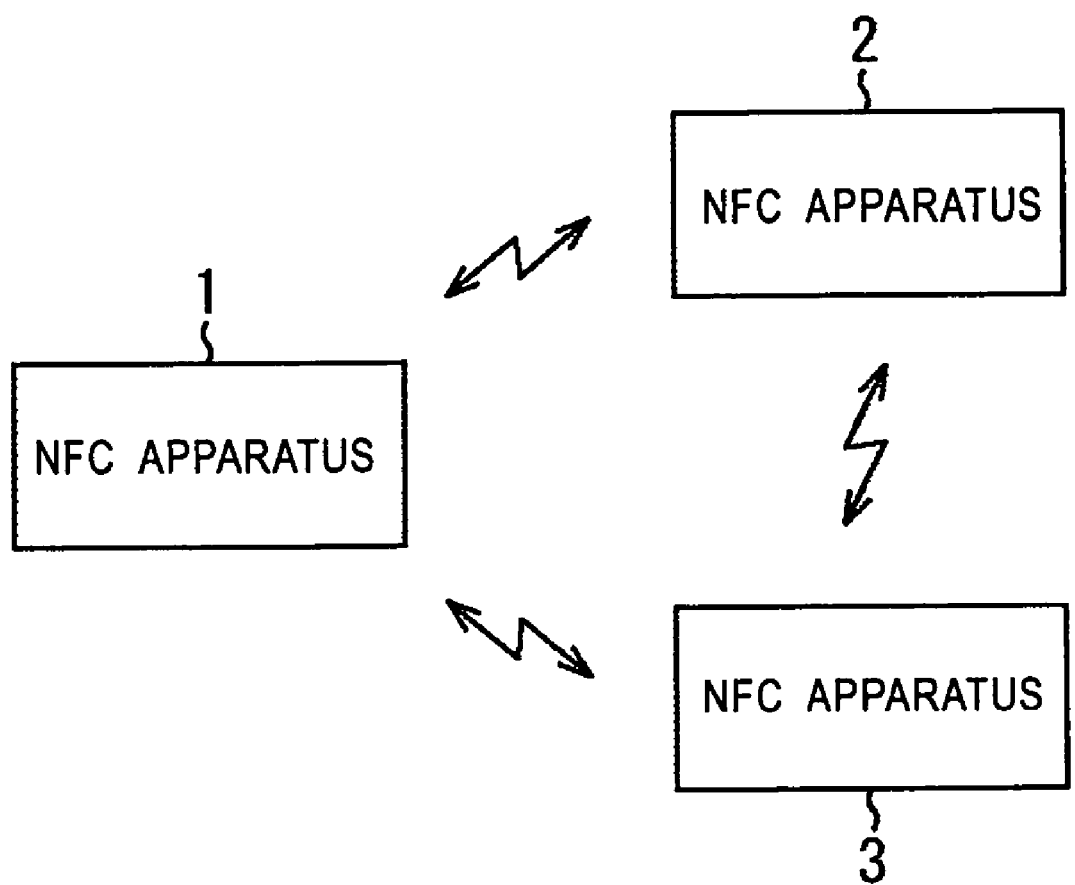
FIG. 1 is a diagram showing the configuration example of an embodiment of a communication system to which the present invention has been applied.

FIG. 1 shows a configuration example of an embodiment of a communication system to which the present invention has been applied. The system consists of logical combination of a plurality of apparatuses, regardless of whether the constituent apparatuses are placed in the same housing or not.

Referring to FIG. 1, the communication system is constructed of three NFC apparatuses 1, 2 and 3. The NFC apparatuses 1 through 3 are adapted to perform near field communication (NFC) based on electromagnetic induction making use of the carrier waves of a single frequency with other NFC apparatuses.

The frequency of the carrier waves used by the NFC communication apparatuses 1 through 3 may be, for example, 13.56 MHz in the industrial scientific medical (ISM) band.

The near field communication means the communication that can be accomplished when the distance between communicating apparatuses is several tens of centimeters or less, and it includes the communication accomplished through the contact between communicating apparatuses or between their housings.

The communication system shown in FIG. 1 may be used as an IC card system in which one or more of the NFC apparatuses 1 through 3 function as readers/writers, while the remaining one or more function as IC cards. Further alternatively, the NFC apparatuses 1 through 3 may be used as a personal digital assistant (PDA), a personal computer (PC), a cellular telephone, a wristwatch, a pen, or other communication system. In other words, the NFC apparatuses 1 through 3 are the apparatuses for performing near field communication, and are not limited to the IC cards, readers/writers, etc. of an IC card system.

The NFC apparatuses 1 through 3 permit communication in two communication modes, and also permit data transmission at a plurality of transmission rates.

The two communication modes are passive mode and active mode. First, the communication between, for example, the NFC apparatuses 1 and 2, will be discussed. In the passive mode, as in the case of the aforesaid conventional IC card system, one of the NFC apparatuses 1 and 2, e.g., the NFC apparatus 1 modulates the carrier waves corresponding to the electromagnetic waves that it generates, so as to send data to the other NFC apparatus, which is the NFC apparatus 2. The NFC apparatus 2 load-modulates the carrier waves corresponding to the electromagnetic waves generated by the NFC apparatus 1, and sends the resulting data to the NFC apparatus 1.

In the active mode, NFC apparatuses 1 and 2 both modulate the carrier waves corresponding to the electromagnetic waves generated by themselves so as to send data.

When the near field communication based on electromagnetic induction is performed, the apparatus that outputs electromagnetic waves first to initiate the communication and may be said to take the initiative is called an initiator. The initiator transmits a command to a communicating party, and the communicating party sends a response associated with the command so as to establish the near field communication. The communicating party who sends the response to the command received from the initiator is called a target.

For instance, if the NFC apparatus 1 begins outputting electromagnetic waves to start communication with the NFC apparatus 2, then the NFC apparatus 1 will be the initiator and the NFC apparatus 2 will be the target, as shown in FIG. 2 and FIG. 3.

In the passive mode, the NFC apparatus 1, which is the initiator, continues outputting electromagnetic waves, as illustrated in FIG. 2. The NFC apparatus 1 modulates the electromagnetic waves generated by itself so as to send data to the NFC apparatus 2, which is the target. The NFC apparatus 2 carries out load-modulation on the electromagnetic waves output from the NFC apparatus 1, which is the initiator, and sends data to the NFC apparatus 1.

In the active mode, when the NFC apparatus 1, which is the initiator, sends data, it first starts outputting electromagnetic waves by itself, and modulates the generated electromagnetic waves so as to send data to the target, i.e., the NFC apparatus 2, as illustrated in FIG. 3. The NFC apparatus 1 stops outputting electromagnetic waves after the completion of the transmission of data. When the target, i.e., NFC apparatus 2, sends data, it begins outputting electromagnetic waves by itself, and modulates the electromagnetic waves so as to send data to the NFC apparatus 1, which is the initiator. The NFC apparatus 2 stops the output of the electromagnetic waves after the transmission of data is finished.

One of the features of the NFC apparatuses 1 through 3, that enables data transmission at a plurality of transmission rates will be discussed later.

The communication system shown in FIG. 1 is constructed of the three NFC apparatuses 1 through 3. The number of the NFC apparatuses constituting the communication system is not limited to three; it may alternatively be two or four or more. Furthermore, the communication system may include, for example, IC cards or readers/writers or the like constituting a conventional IC card system, in addition to the NFC apparatuses.

Figure 4:
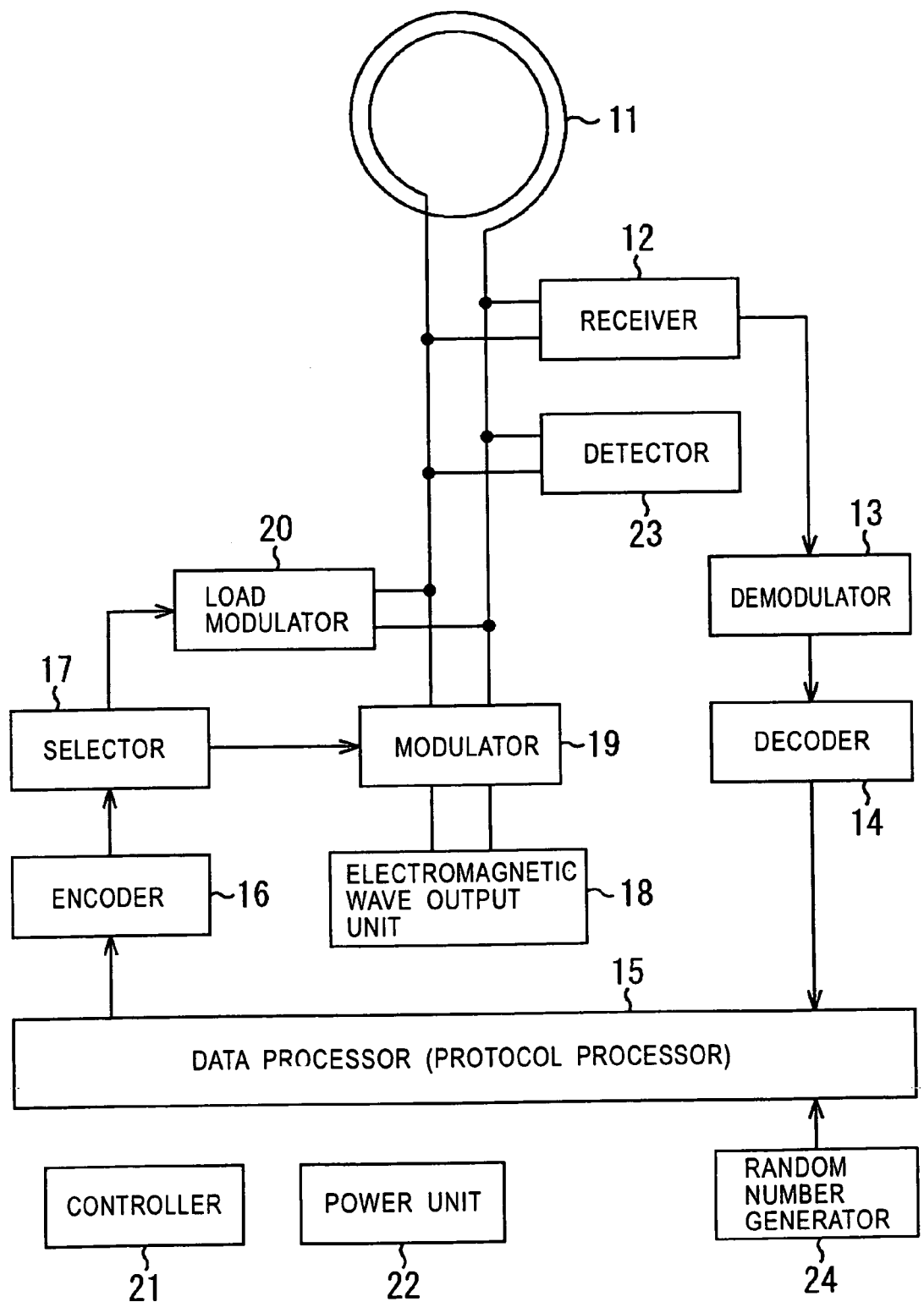
FIG. 4 is a block diagram showing a configuration example of an NFC apparatus.

FIG. 4 shows a configuration example of the NFC apparatus 1 shown in FIG. 1. The remaining NFC apparatuses 2 and 3 shown in FIG. 1 share the same configuration as the NFC apparatus 1 shown in FIG. 4; therefore, the explanation thereof will not be repeated.

An antenna 11 having a closed loop coil outputs electromagnetic waves produced by changes in the currents flowing in the coil. Moreover, changes in the magnetic flux flowing in the coil of the antenna 11 causes the currents to flow in the antenna 11.

A receiver 12 receives the currents flowing in the antenna 11 and carries out tuning and detection on the currents, then outputs the currents to a demodulator 13. The demodulator 13 demodulates the signals supplied from the receiver 12 and supplies the demodulated signals to a decoder 14. The decoder 14 decodes, for example, Manchester code or the like of the signals supplied from the demodulator 13, and supplies the data obtained as the result of the decoding to a data processor 15.

Based on the data supplied from the decoder 14, the data processor 15 performs the processing to be carried out by the protocol of a transport layer or the like and other predetermined processing. The data processor 15 also supplies the data to be transmitted to other apparatuses to an encoder 16. Furthermore, the data processor 15 receives a random number supplied from a random number generator 24, and generates an NFC identification (hereinafter referred to as "NFCID") used as the information for identifying the NFC apparatus itself. When a request for the NFCID is received by a polling request frame, which will be discussed later, from other apparatuses, the data processor 15 places the NFCID generated from the random number, which have been supplied from the random number generator 24, in a polling response frame, which will be discussed hereinafter, as the NFCID that identifies itself, and supplies the generated NFCID to the encoder 16.

The encoder 16 encodes the data supplied from the data processor 15 into Manchester code before supplying it to a selector 17. The selector 17 selects either a modulator 19 or a load modulator 20, then outputs the signals supplied from the encoder 16 to the selected one.

The selector 17 selects the modulator 19 or the load modulator 20 under the control of a controller 21. If the communication mode is the passive mode and the NFC apparatus 1 serves as a target, then the controller 21 makes the selector 17 select the load modulator 20. If the communication mode is the active mode or the passive mode, and the NFC apparatus 1 serves as an initiator, then the controller 21 makes the selector 17 select the modulator 19. Thus, in the case where the communication is in the passive mode and the NFC apparatus 1 works as a target, the signals output from the encoder 16 are supplied to the load modulator 20 through the intermediary of the selector 17. In any other cases, the signals output from the encoder 16 are supplied to the modulator 19 through the intermediary of the selector 17.

An electromagnetic wave output unit 18 provides the antenna 11 with currents for radiating the carrier waves (electromagnetic waves) of a predetermined single frequency from the antenna 11. The modulator 19 modulates the carrier waves based on the currents supplied from the electromagnetic wave output unit 18 to the antenna 11 on the basis of the signals received from the selector 17. Thus, the antenna 11 radiates the electromagnetic waves produced by modulating the carrier waves on the basis of the data output to the encoder 16 from the data processor 15.

The load modulator 20 changes the impedance obtained when the antenna 11 is observed as the coil from outside on the basis of the signals received from the selector 17 so as to perform load modulation. If an RF field or magnetic field has been generated around the antenna 11 by the output of the electromagnetic waves serving as carrier waves from other apparatus, then the RF field around the antenna 11 changes as the impedance of the antenna 11 as the coil changes. This causes the carrier waves serving as the electromagnetic waves output from another apparatus to be modulated on the basis of the signals supplied from the selector 17, and the data output to the encoder 16 from the data processor 15 is sent to another apparatus outputting the electromagnetic waves.

The modulator 19 and the load modulator 20 may use, for example, the amplitude shift keying (ASK) method to perform modulation. The modulation method used in the modulator 19 and the load modulator 20 is not limited to ASK; it may be the phase shift keying (PSK), the quadrature amplitude modulation (QAM), etc. The degree of amplitude modulation is not limited to 8% to 30%, 50%, 100% or other numerical values; any preferable one may be selected.

The controller 21 controls the blocks constituting the NFC apparatus 1. A power unit 22 supplies necessary power to the blocks making up the NFC apparatus 1. In FIG. 4, the line indicating the control of the blocks constituting the NFC apparatus 1 by the controller 21 and the line indicating the power supplied to the blocks constituting the NFC apparatus 1 from the power unit 22 are not shown to avoid complication in the diagram.

A detector 23 receives the currents flowing in the antenna 11 in the same manner as the receiver 12 does, and detects whether electromagnetic waves of a predetermined level of magnetic flux density or more are being received by the antenna 11 on the basis of the received currents.

The random number generator 24 generates random numbers and supplies them to the data processor 15.

In the aforementioned case, the decoder 14 and the encoder 16 process the Manchester code used in the foregoing type C. It is also possible for the decoder 14 and the encoder 16 to perform processing by selecting one of a plurality of codes, such as the modified mirror used in type A or the NRZ used in type C, rather than limiting only to the Manchester code.

Figure 5:
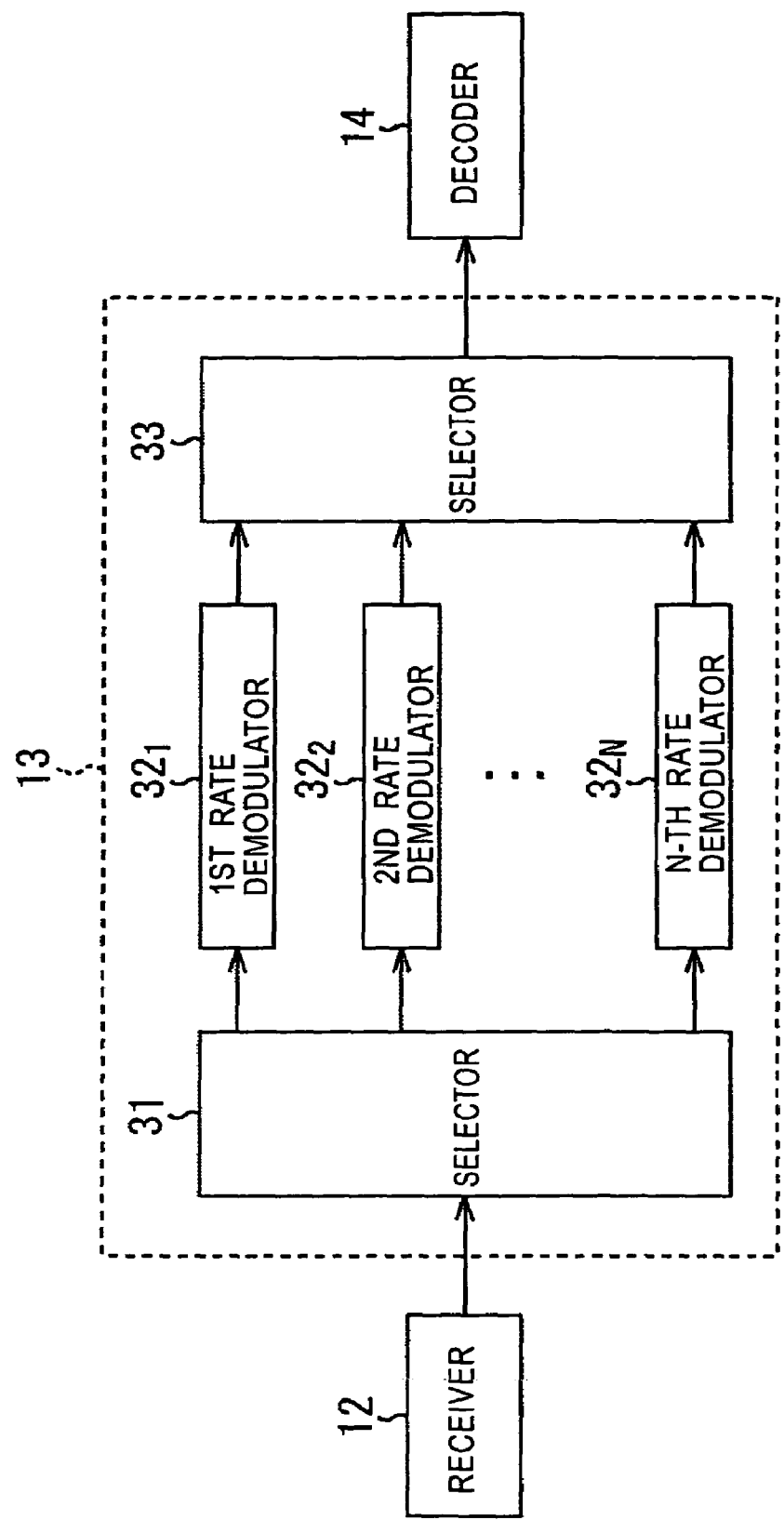
FIG. 5 is a block diagram showing a configuration example of a demodulator.

FIG. 5 shows a configuration example of the demodulator 13 shown in FIG. 4.

Referring to FIG. 5, the demodulator 13 is constructed of a selector 31, an N (2 or more) number of demodulators $32_1$ through $32_N$, and a selector 33.

The selector 31 selects one demodulator $32_n$ (n=1, 2, . . . , N) among the N number of demodulators $32_1$ to $32_N$ under the control of the controller 21 shown in FIG. 4, then supplies a signal output from the receiver 12 to the selected demodulator $32_n$.

The demodulator $32_n$ demodulates the signal transmitted at an n-the transmission rate and supplies the demodulated signal to a selector 33. The demodulator $32_n$ and a demodulator $32_{n'}$ (n≠n') demodulate signals transmitted at different transmission rates. This means that the demodulator 13 shown in FIG. 5 is capable of demodulating the signals transmitted at the N number of different transmission rates (first to N-th transmission rates). The N number of different transmission rates includes, for example, the aforementioned 106 kbps, 212 kbps or even higher rates, such as 424 kbps or 848 kbps. In other words, the N number of different transmission rates may include existing transmission rates and other transmission rates in a near field communication performed by, for example, an existing IC card system.

The selector 33 selects one demodulator $32_n$ from among the N number of the demodulators $32_1$ to $32_n$ under the control of the controller 21, and supplies the demodulated output obtained by the demodulator $32_n$ to the decoder 14.

In the demodulator 13 configured as described above, the controller 21 shown in FIG. 4 makes the selector 31 select the N number of the demodulators $32_1$ to $32_n$ in sequence thereby to make each of the demodulators $32_1$ to $32_n$ demodulate the signals supplied from the receiver 12 through the intermediary of the selector 31. The controller 21 controls the selector 33 such that, for example, the selector 33 may recognize the demodulator $32_n$ that has properly demodulated a signal supplied from the receiver 12 through the selector 31 so as to select the output of the demodulator $32_n$. Under the control of the controller 21, the selector 33 selects the demodulator $32_n$ so as to supply the proper demodulation output obtained by the demodulator $32_n$ is supplied to the decoder 14.

Thus, the demodulator 13 is capable of demodulating the signals transmitted at any transmission rates among the N number of different transmission rates.

It is possible to set the demodulators $32_1$ to $32_N$ so that they provide demodulation outputs only when demodulation has been properly accomplished, and provide no outputs (using, for example, high impedance) if they fail to accomplish proper demodulation. In this case, the selector 33 may take the logic sum of all outputs of the demodulators $32_1$ to $32_N$, and output the logical sum to the decoder 14.

Figure 6:
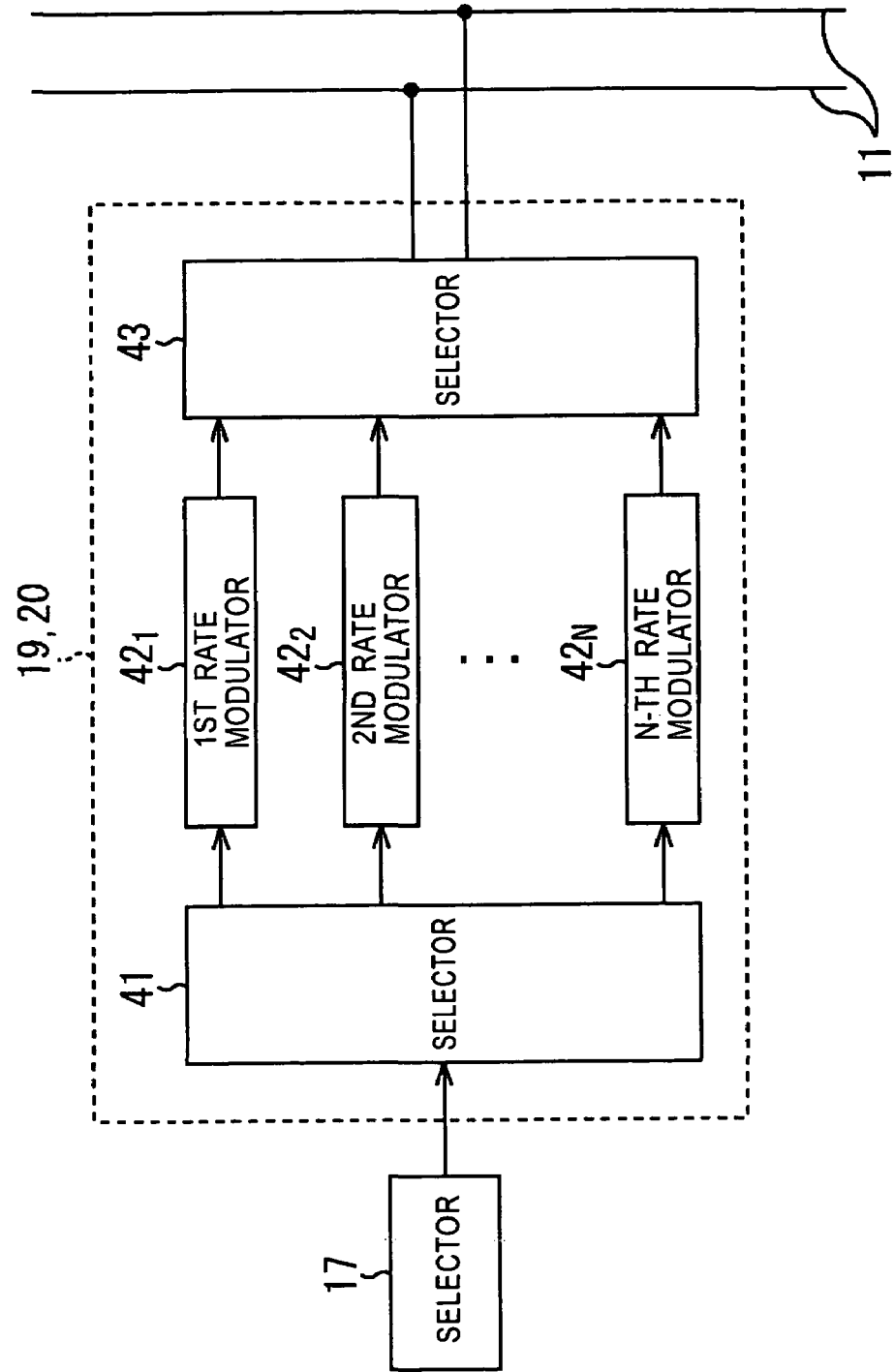
FIG. 6 is a block diagram showing a configuration example of a modulator.

FIG. 6 shows a configuration example of the modulator 19 shown in FIG. 4.

Referring to FIG. 6, the modulator 19 is constructed of a selector 41, an N number (2 or more) of modulators $42_1$ through $42_N$, and a selector 43.

The selector 41 selects one modulator $42_n$ (n=1, 2, . . . , N) among the N number of modulators $42_1$ to $42_N$ under the control of the controller 21 shown in FIG. 4, then supplies a signal output from the selector 17 shown in FIG. 4 to the selected modulator $42_n$.

The modulator $42_n$ modulates the carrier waves as the currents flowing in the antenna 11 through the intermediary of the selector 43 on the basis of the signals supplied from the selector 41 such that data is transmitted at an n-th transmission rate. The modulator $42_n$ and a modulator $42_{n'}$ (n≠n') modulate carrier waves at different transmission rates. This means that the modulator 19 shown in FIG. 6 is capable of sending data at the N number of different transmission rates from a first to N-th transmission rates. The N number of different transmission rates may be the same as, for example, the transmission rates that can be handled by the demodulator 13 shown in FIG. 5.

The selector 43 selects the same modulator $42_n$ as that selected by the selector 41 from among the N number of the modulators $42_1$ to $42_N$ under the control of the controller 21, and electrically connects the modulator $42_n$ and the antenna 11.

In the modulator 19 configured as described above, the controller 21 shown in FIG. 4 makes the selector 41 select the N number of the modulators $42_1$ to $42_N$ in sequence thereby to make each of the modulators $42_1$ to $42_N$ modulate the carrier waves as the currents flowing in the antenna 11 through the selector 43 on the basis of the signals supplied from the selector 41.

Thus, the modulator 19 is capable of modulating the carrier waves to send data such that the data may be sent at any transmission rates among the N number of different transmission rates.

The load modulator 20 shown in FIG. 4 shares the same configuration as that of, for example, the modulator 19 shown in FIG. 6, so that the explanation thereof will be omitted.

Thus, the NFC apparatuses 1 through 3 are capable of modulating the carrier waves into the signal of data transmitted at one of the N number of different transmission rates and of demodulating the signal of the data transmitted at one of the N number of different transmission rates. The N number of different transmission rates may include the existing transmission rates in the near field communication used by an existing IC card system of the FeliCa type or the like, and other transmission rates. Hence, the NFC apparatuses 1 through 3 permit the transfer of data at any transmission rate of the N number of different transmission rates among them. Moreover, the NFC apparatuses 1 through 3 permit the transfer of data at the transmission rates used by IC cards or readers/writers constituting an existing IC card system to perform the data transfer between them.

Therefore, introducing the NFC apparatuses 1 through 3 into the services based on existing near field communication will not confuse users, thus permitting easy introduction of the NFC apparatuses. It is also possible to easily introduce the NFC apparatuses 1 through 3 into the services that will use the near field communication performed at higher data rates expected to become available in the future, while achieving coexistence with existing near field communication.

Furthermore, the NFC apparatuses 1 through 3 permit data transmission in the active mode in which they output electromagnetic waves by themselves to send data in addition to the passive mode that has been used in the conventional near field communication. This arrangement allows data to be directly transferred without other apparatuses, such as readers/writers.

Figure 7:
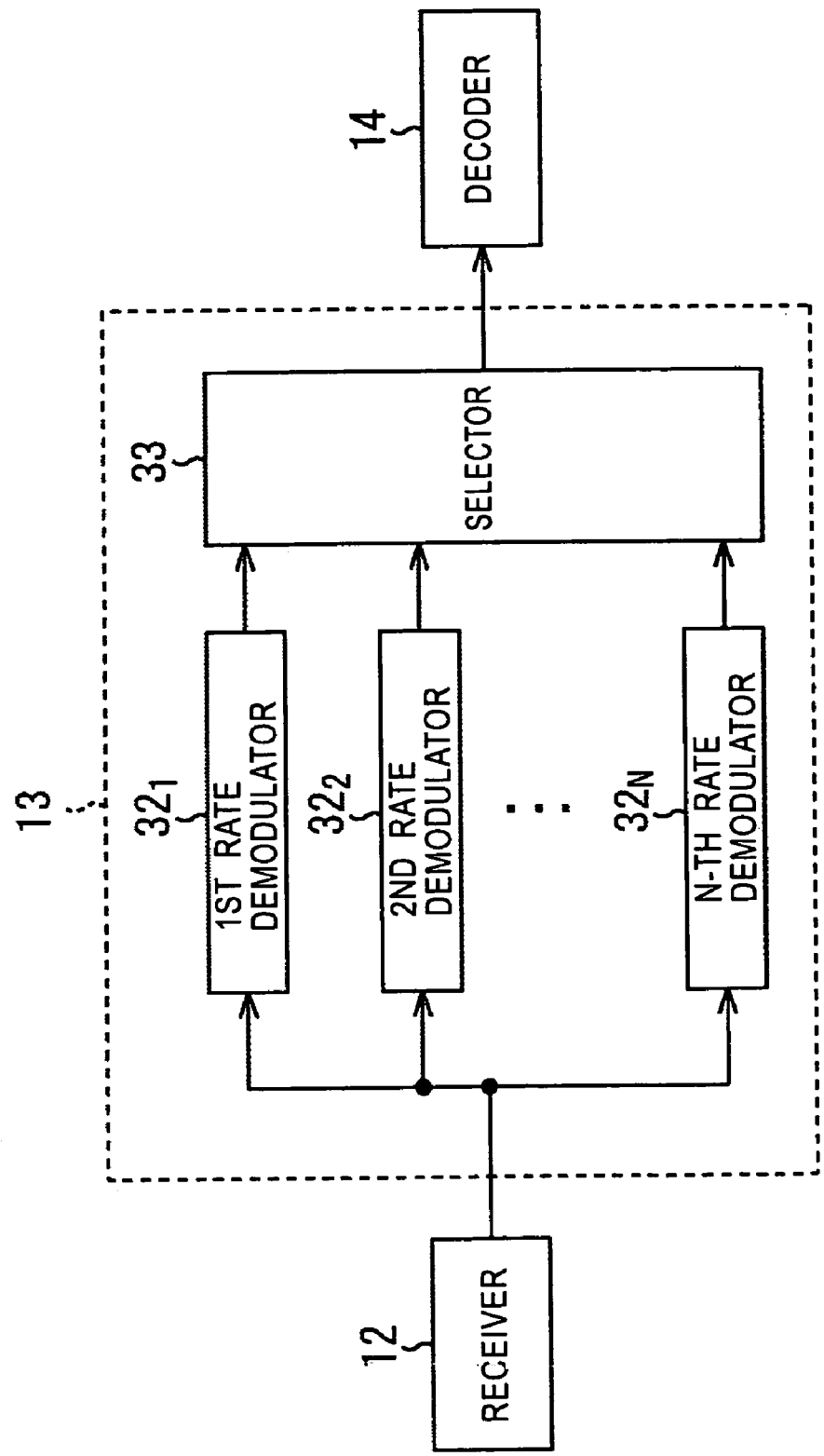
FIG. 7 is a block diagram showing another configuration example of the demodulator.

FIG. 7 shows another configuration example of the demodulator 13 shown in FIG. 4. In FIG. 7, the like components corresponding to those shown in FIG. 5 are assigned the same reference numerals, and the explanation thereof will be omitted, as necessary. This means that the demodulator 13 shown in FIG. 7 basically shares the same configuration as that shown in FIG. 5 except for the absence of the selector 31.

In the embodiment shown in FIG. 7, the signals output from a receiver 12 are simultaneously supplied to demodulators $32_1$ through $32_N$, and the signals from the receiver 12 are simultaneously demodulated by the demodulators $32_1$ through $32_N$. A controller 21 recognizes, for example, a demodulator $32_n$ that has successfully demodulated the signal from the receiver 12, and controls the selector 33 so that the output of the demodulator $32_n$ is provided. The selector 33 selects the demodulator $32_n$ under the control of the controller 21, and the proper demodulation output obtained by the demodulator $32_n$ is supplied to a decoder 14.

In the embodiment shown in FIG. 7, the demodulators $32_1$ through $32_N$ are required to always perform demodulating operation. In contrast to this, according to the embodiment shown in FIG. 5, only one of the demodulators $32_1$ through $32_N$ that has been selected by the selector 31 is required to perform the demodulating operation, while the rest may remain at rest. Accordingly, the configuration shown in FIG. 5 is more advantageous than that shown in FIG. 7 to save power consumed by the apparatuses. On the other hand, the configuration shown in FIG. 7 is more advantageous than that shown in FIG. 5 to quickly secure proper demodulation output.

Figure 8:
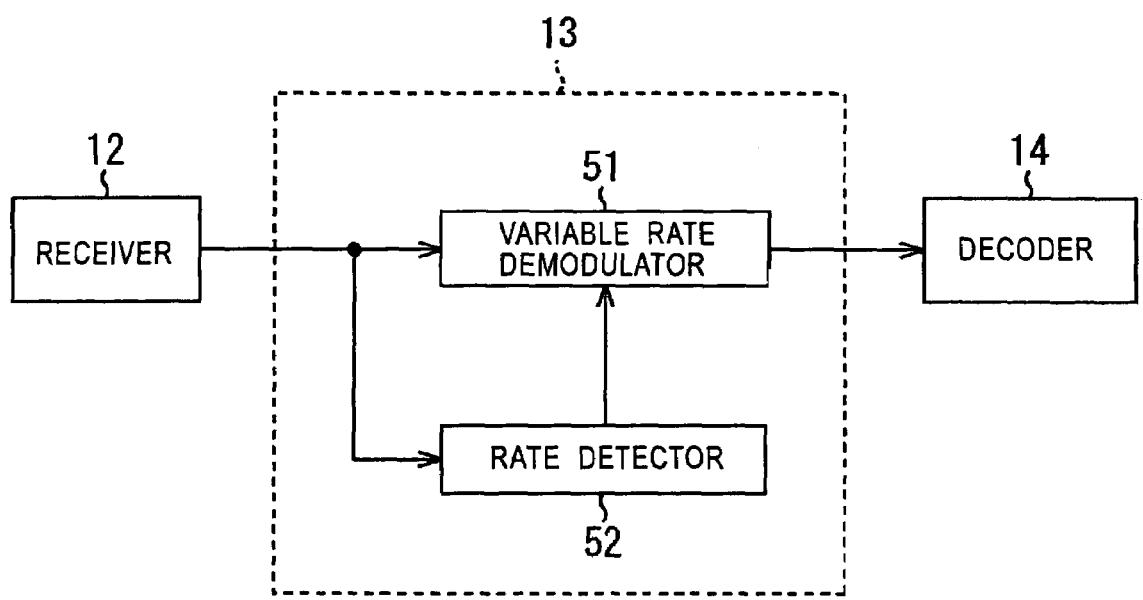
FIG. 8 is a block diagram showing still another configuration example of the demodulator.

FIG. 8 shows still another configuration example of the demodulator 13 shown in FIG. 4.

Referring to FIG. 8, the demodulator 13 is constructed of a variable rate demodulator 51 and a rate detector 52.

The variable rate demodulator 51 demodulates a signal supplied from a receiver 12 as the signal of the transmission rate based on the instruction received from the rate detector 52, and supplies the demodulation result to a decoder 14. The rate detector 52 detects the transmission rate of the signal supplied from the receiver 12, and instructs the variable rate demodulator 51 to demodulate the signal of the transmission rate.

In the demodulator 51 configured as described above, a signal output from the receiver 12 is supplied to the variable rate demodulator 51 and the rate detector 52. The rate detector 52 detects which one of, for example, an N number of different transmission rates from a first through an N-th is used for the signal supplied from the receiver 12, and instructs the variable rate demodulator 51 to demodulate the signal of the detected transmission rate. Then, the variable rate demodulator 51 demodulates the signal supplied from the receiver 12 as the signal of the transmission rate based on the instruction received from the rate detector 52, and supplies the demodulation result to the decoder 14.

Any one of the NFC apparatuses 1 through 3 may be an initiator that initiates communication by outputting electromagnetic waves first. In the active mode, the NFC apparatuses 1 through 3 output electromagnetic waves by themselves whether they are initiators or targets.

Hence, when the NFC apparatuses 1 through 3 are close to each other and two or more of them simultaneously output electromagnetic waves, a collision takes place, preventing communication from being accomplished.

As a solution to the above problem, each of the NFC apparatuses 1 through 3 is adapted to first detect whether there is an RF field generated by the electromagnetic waves from other apparatus, and initiates radiating its electromagnetic waves only if it detects no presence of the RF field, thereby avoiding a collision. This processing for first checking for the presence of the electromagnetic waves from other apparatus and then starting the output of electromagnetic waves only if it finds the absence of the electromagnetic waves is carried out to prevent collisions. The processing is known as an RF collision avoidance (RFCA).

There are two types of RFCA processing. One type is the initial RFCA processing carried out by the NFC apparatuses which attempt to be initiators (one or more of the NFC apparatuses 1 through 3 in FIG. 1). The other type is the response RFCA processing carried out before an NFC apparatus tries to start outputting electromagnetic waves during communication in the active mode. Both the initial RFCA processing or the response RFCA processing are the same in that an NFC apparatus first detects for the presence of the electromagnetic waves from other apparatus before starting to output electromagnetic waves, then starts outputting electromagnetic waves only if the detection result indicates the absence of the electromagnetic waves from other apparatus. The initial RFCA processing and the response RFCA processing differ primarily in the time from the moment the absence of the electromagnetic waves of other apparatus is detected to the moment the output of electromagnetic waves must be started.

Figure 9:
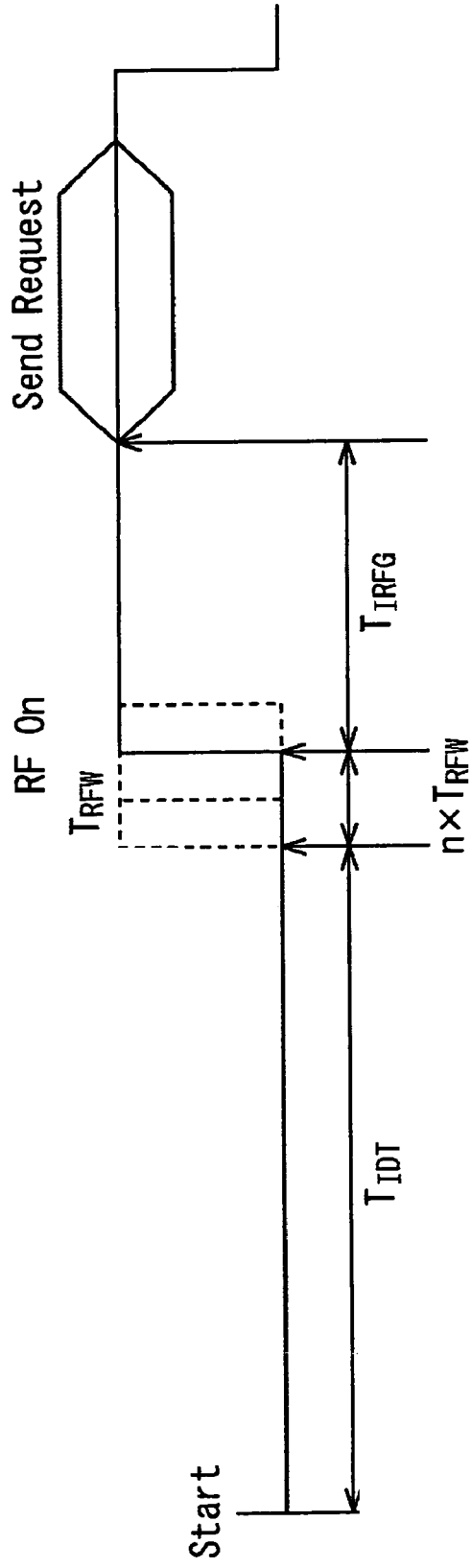
FIG. 9 is a timing chart illustrating initial RFCA processing.

Referring first to FIG. 9, the initial RFCA processing will be described.

FIG. 9 shows the electromagnetic waves started to be output by the initial RFCA processing. Referring to FIG. 9, the axis of abscissa indicates time and the axis of ordinate indicates the level of the electromagnetic waves output by the NFC apparatuses. The same applies to FIG. 10, which will be referred to later.

An NFC apparatus trying to be an initiator is always detecting for the electromagnetic waves from other apparatus. If no electromagnetic waves from other apparatus are continuously detected for a time defined by $T_{IDT}+n \times T_{RFW}$, then the NFC apparatus begins radiating electromagnetic waves and starts the transmission of data that includes a command (Send Request) after a time $T_{IRFG}$ elapses following the start of the output of electromagnetic waves.

$T_{IDT}$ in the time $T_{IDT}+n \times T_{RFW}$ is referred to as an initial delay time. When the frequency of carrier waves is denoted by $f_c$, a value larger than, for example, $4096/f_c$ is used for the initial delay time. "n" denotes an integer of, for example, 0 or more but 3 or less and it is generated using random numbers. $T_{RFW}$ is referred to as an RF waiting time, and uses, for example, $512/f_c$. The time $T_{IRFG}$ is referred to as an initial guard time and takes, for example, a value larger than 5 ms.

Using a randomly generated number "n" for the time $T_{IDT}+n \times T_{RFW}$ during which no electromagnetic waves should be detected controls the possibility of a plurality of NFC apparatuses starting the output of their electromagnetic waves at the same timing.

When an NFC apparatus begins radiating electromagnetic waves during the initial RFCA processing, the NFC apparatus becomes an initiator. At that time, if the active mode is chosen as the communication mode, then the NFC apparatus which has become the initiator stops the output of the electromagnetic waves upon completion of the transmission of its own data. Meanwhile, if the passive mode is set as the communication mode, then the NFC apparatus that has become an initiator continues the output of the electromagnetic waves, which was started by the initial RFCA processing, until the communication with a target is completely finished.

Figure 10:
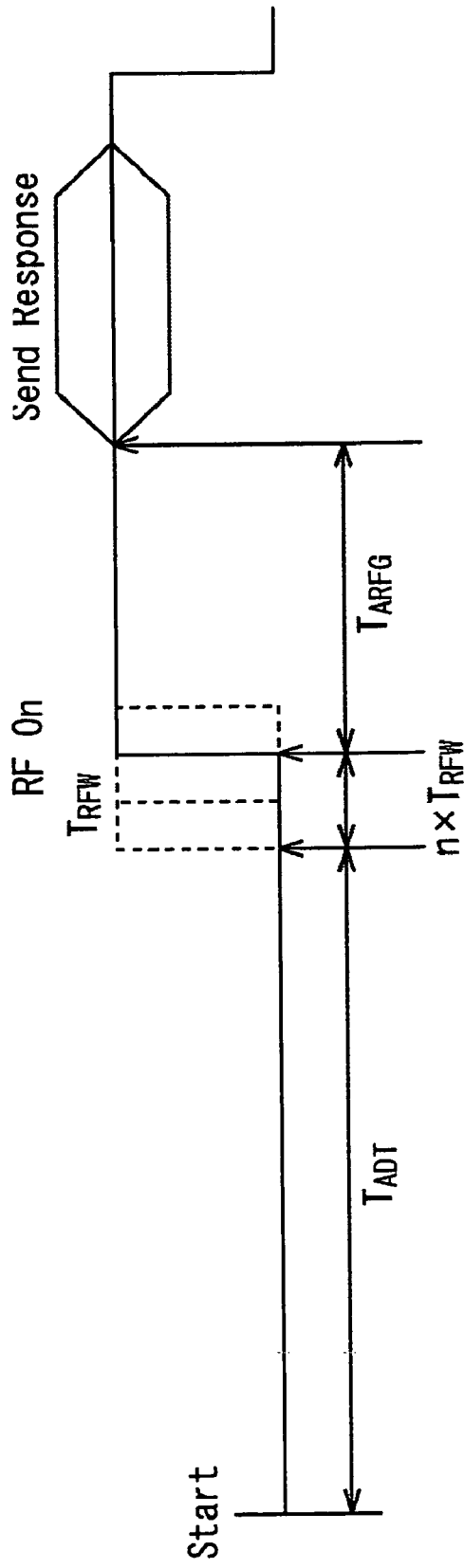
FIG. 10 is a timing chart illustrating active RFCA processing.

FIG. 10 shows the electromagnetic waves started to be output by the response RFCA processing.

An NFC apparatus intending to radiate electromagnetic waves in the active mode detects for the electromagnetic waves from other apparatus. If no electromagnetic waves from other apparatus are continuously detected for a time defined by $T_{ADT}+n \times T_{RFW}$, then the NFC apparatus begins radiating electromagnetic waves and starts the transmission of data (Send Response) after a time $T_{ARFG}$ elapses following the start of the output of the electromagnetic waves.

In the time $T_{ADT}+n \times T_{RFW}$, n and $T_{RFW}$ are the same as those by the initial RFCA processing illustrated in FIG. 9. $T_{ADT}$ in the time $T_{ADT}+n \times T_{RFW}$ is referred to as an active delay time and takes a value of, for example, $768/f_c$ or more but 2559/$f_c$ or less. Time $T_{ARFG}$ is referred to as an active guard time and takes a value larger than, for example, 1024/$f_c$.

As is obvious from FIG. 9 and FIG. 10, there must be no electromagnetic waves for at least the initial delay time $T_{IDT}$ before the output of electromagnetic waves can be started by the initial RFCA processing, or for at least the active delay time $T_{ADT}$ before the output of electromagnetic waves can be started by the response RFCA processing.

The initial delay time $T_{IDT}$ takes a value larger than 4096/$f_c$, while the active delay time $T_{ADT}$ takes a value of 768/$f_c$ or more but 2559/$f_c$ or less, as described above. This means that if an NFC apparatus intends to be an initiator, the state wherein no electromagnetic waves exist must last longer than in the case where the apparatus outputs electromagnetic waves in the active communication mode. In other words, if the NFC apparatus is ready to output electromagnetic waves during the active communication mode, it must start outputting electromagnetic waves earlier following the detected absence of electromagnetic waves than in the case where it attempts to be an initiator. The reason for this will be described below.

When the NFC apparatuses communicate with each other in the active mode, one of the NFC apparatuses outputs electromagnetic waves by itself to send data, then stops outputting the electromagnetic waves. Then, the other NFC apparatus starts outputting electromagnetic waves to send data. Hence, in the active mode communication, there are moments wherein both NFC apparatuses are not radiating electromagnetic waves. When an NFC apparatus tries to be an initiator, therefore, it is required to confirm for a sufficiently long time that no other apparatuses are emitting electromagnetic waves around the NFC apparatus trying to be an initiator so as to make sure that the active mode communication is not being affected around the NFC apparatus.

In the active mode, an initiator outputs electromagnetic waves to send data to a target, as already mentioned. The target begins radiating electromagnetic waves to send data to the initiator after the initiator stops radiating its electromagnetic waves. Thereafter, the initiator begins radiating electromagnetic waves to send data to the target after the target stops outputting the electromagnetic waves. After that, the transfer of data between the initiator and the target is accomplished in the same manner.

Accordingly, when an NFC apparatus attempting to be an initiator exists around an initiator and a target engaged in the active mode communication, if there is a sufficiently long period of time between the stop of the output of the electromagnetic waves from either the initiator or the target engaged in the active mode communication and the beginning of the output of electromagnetic waves from the other apparatus, it means the absence of electromagnetic waves during that period of time. Hence, the NFC apparatus attempting to be an initiator begins outputting electromagnetic waves by the initial RFCA processing. In this case, the preceding active mode communication will be interfered with.

For this reason, in the response RFCA processing performed during the active mode communication, it is set such that electromagnetic waves are emitted relatively soon after the absence of electromagnetic waves is confirmed.

As explained in conjunction with FIG. 9, the NFC apparatus which attempts to be an initiator starts outputting electromagnetic waves by the initial RFCA processing, then sends data. The NFC apparatus attempting to be an initiator becomes the initiator by starting the output of electromagnetic waves, and an NFC apparatus located close to the initiator will be a target. For the initiator to exchange data with the target, the target to exchange data with must be identified. For this purpose, after beginning the output of the electromagnetic waves by the initial RFCA processing, the initiator requests NFCIDs, which is the information for identifying targets, from one or more targets located in the vicinity of the initiator. The targets existing near the initiator send the NFCIDs identifying themselves to the initiator in response to the request from the initiator.

The initiator identifies the targets by the NFCIDs received from the targets as described above, and exchange data with the identified targets. The processing by which the initiator identifies the targets located around or positioned in the vicinity of itself by their NFCIDs is referred to as the single device detection (SDD) processing.

In the SDD processing, the initiator requests the NFCIDs of the targets by sending a frame called "polling request frame" to the targets. Upon receipt of the polling request frame, each target creates its own NFCID by a randomly generated number, and sends out a frame called "polling response frame" that includes the generated NFCID. The initiator recognizes the NFCID of the target by receiving the polling response frame sent from the target.

If there are a plurality of targets around the initiator, and the initiator requests the NFCIDs from the targets around itself, then two or more targets may simultaneously send their NFCIDs. If this happens, the NFCIDs sent from the two or more targets collide, preventing the initiator from recognizing the collided NFCIDs.

In order to minimize the possibility of the collision of the NFCIDs, the SDD processing uses, for example, time slots.

Figure 11:
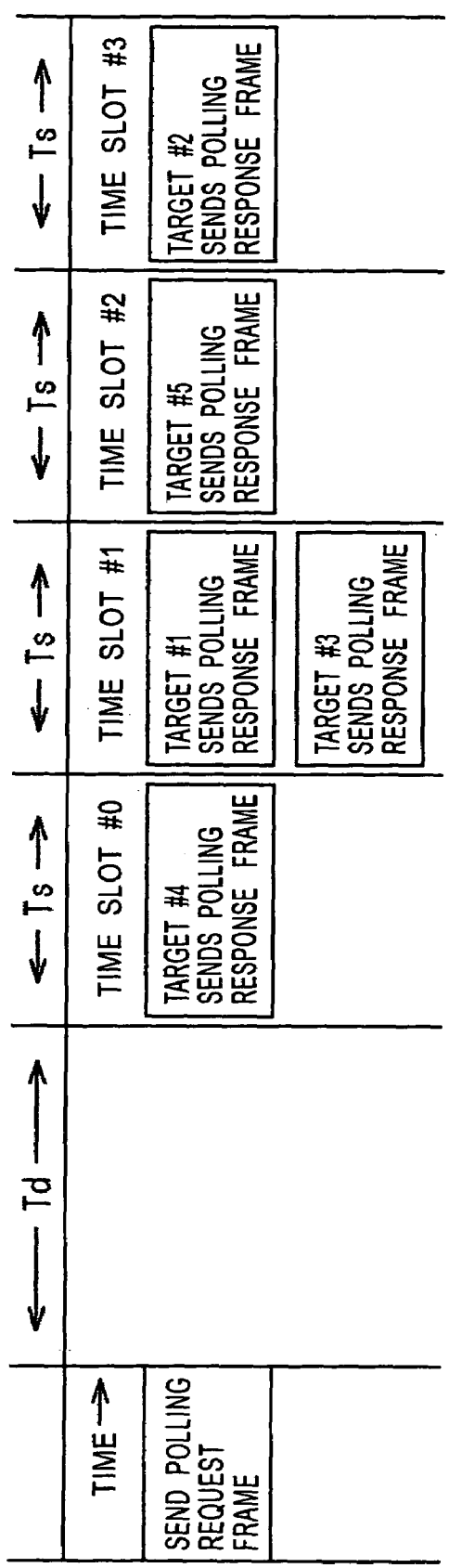
FIG. 11 is a diagram for explaining SDD processing.

FIG. 11 illustrates the sequence of the SDD processing that uses time slots. It is assumed that five targets #1, #2, #3, #4 and #5 exist around the initiator in FIG. 11.

In the SDD processing, the initiator sends the polling request frame. After the completion of the transmission of the polling request frame, a predetermined time $T_d$ is allowed, then a time slot having the width of a predetermined time $T_s$ is provided. The time $T_d$ is set to, for example, 512×64/$f_c$, and the width of the time slot $T_s$ is set to, for example, 256×64/$f_c$. The time slots are identified by sequential numbers (integers) from zero assigned thereto, starting with, for example, temporally most leading one.

Although FIG. 11 shows only four time slots #0, #1, #2 and #3, up to a predetermined number (e.g., sixteen) of the time slots may be provided. A number of time slots denoted by TSN that can be provided for a certain polling request frame is specified by an initiator and the specified TSN is included in the polling request frame to be sent to a target.

A target receives the polling request frame sent from the initiator and recognizes the number of time slots TSN disposed in the polling request frame. The target further generates an integer R within the range from 0 to TSN-1 by using a random number, and sends out a polling response frame that includes its own NFCID at the timing of time slot #R specified by the integer R.

As described above, the targets determines the time slots, which specify the timings for sending out the polling response frames, by using random numbers. With this arrangement, the timings at which a plurality of targets sends polling response frames vary, thus making it possible to minimize the chances of the collision among the polling response frames sent from the plurality of targets.

However, even when the targets determines the time slots specifying the timings for sending out the polling response frames by using random numbers, there is still a possibility that the time slots during which the plurality of targets send out the polling response frames overlap, resulting in the collision of the polling response frames. In the embodiment shown in FIG. 11, the polling response frame of the target #4 is sent out in a time slot #0, the polling response frames of the targets #1 and #3 are sent out in a time slot #1, the polling response frame of the target #5 is sent out in a time slot #2, and the polling response frame of the target #2 is sent out in a time slot #3. The polling response frames of the targets #1 and #3 collide with each other.

In this case, the initiator will not be able to properly receive the polling response frames of the targets #1 and #3 that collide with each other. For this reason, the initiator resends a polling request frame to request the retransmission of the polling response frames with their NFCIDs included therein from the targets #1 and #3. Thereafter, the transmission of the polling request frame from the initiator and the transmission of the polling response frames from the targets are repeated until the initiator recognizes the NFCIDs of all the targets #1 through #5 located around the initiator.

If all the targets #1 through #5 return their polling response frames in reply to the polling request frame resent from the initiator, then the collision between polling response frames is likely to happen again. To avoid this, if a target receives a polling request frame from the initiator and then another polling request frame relatively soon after the first one, then the target may ignore the second one. In this case, however, according to the embodiment shown in FIG. 11, the initiator cannot recognize the NFCIDs of the targets #1 and #3 because of the collision between their polling response frames sent out in reply to the polling request frame sent out first. The initiator, therefore, cannot accomplish data exchange with the target #1 or #3.

The targets #2, #4 and #5 whose polling response frames have been properly received by the initiator to recognize their NFCIDs are temporarily removed from the communication targets. This makes it possible to set these three targets not to return polling response frames in reply to a polling request frame. Thus, only the targets #1 and #3 whose NFCIDs have not been recognized by the first transmission of the polling request frame will return their polling response frames in reply to the polling request frame resent by the initiator. In this way, therefore, the NFCIDs of all the targets #1 through #5 can be recognized, while minimizing the possibility of the collision among polling response frames.

As previously discussed, the targets determine or generate their own NFCIDs using random numbers upon receipt of a polling request frame. It is possible, therefore, that the same NFCID is included in the polling response frames sent from different targets to the initiator. If the initiator receives the polling response frames including the same NFCID in different time slots, then the initiator will be able to resend the polling request frame as in the case of, for example, the occurrence of the collision of polling response frames.

In the case discussed above, the time slots are provided by using the timing immediately following the transmission of a polling request frame by the initiator, and the targets send their polling response frames at the timings of the time slots. It is also possible, however, to accomplish the exchange of the polling request frames and the polling response frames between the initiator and the targets without using the time slots. More specifically, an arrangement can be made such that, when a target receives a polling request frame, the target may send its polling response frame at an arbitrary timing. In this case, however, it is anticipated that more targets are likely to send their polling response frames at the same time in reply to the polling request frame sent from the initiator, as compared with the case where the time slots are used. If a plurality of targets simultaneously send their polling response frames, the initiator cannot properly receive the polling response frames due to collisions, so that the initiator need to resend the polling request frame.

As previously mentioned, the NFC apparatuses are capable of exchanging data with IC cards or readers/writers constituting existing IC card systems at the transmission rates used by the IC cards or the readers/writers. If the targets are, for example, the IC cards in an existing IC card system, the SDD processing is carried out, for instance, as described below.

The initiator starts radiating electromagnetic waves by the initial RFCA processing, and the IC card, which is the target, obtains the power from the electromagnetic waves to begin the processing. More specifically, in this case, the target is the IC card of the existing IC card system, so that it generates the power to operate from the electromagnetic waves output from the initiator.

The target obtains the power to be ready for the operation, and prepares for receiving a polling request frame within, for example, 2 seconds at the longest to wait for the polling request frame sent from the initiator.

Meanwhile, the initiator can send out the polling request frame regardless of whether or not the target is ready to receive the polling request frame.

When the target receives the polling request frame from the initiator, it sends its polling response frame to the initiator at the timing of the predetermined time slot, as described above. When the initiator properly receives the polling response frame from the target, it recognizes the NFCID of the target, as described above. If the initiator cannot properly receive the polling response frame from the target, then it will resend the polling request frame.

In this case, since the target is an IC card of the existing IC card system, it generates the power to operate from the electromagnetic waves output from the initiator. For this reason, the initiator continues the output of electromagnetic waves started by the initial RFCA processing until the communication with the target is completely finished.

Next, in the NFC apparatus, the initiator sends out a command to the target, and the target sends back a response associated with the command from the initiator so as to perform the communication.

FIG. 12 shows the commands sent by an initiator to a target, and the responses sent by the target to the initiator.

Referring to FIG. 12, the ones having the characters "REQ" following the underbars (_) denote commands, while the ones having the characters "RES" following the underbars (_) denote responses. For the embodiment shown in FIG. 12, there are prepared six different commands, ATR_REQ, WUP_REQ, PSL_REQ, DEP_REQ, DSL_REQ and RLS_REQ, and there are also prepared six different responses, ATR_RES, WUP_RES, PSL_RES, DEP_RES, DSL_RES and RLS_RES associated with the above commands. As previously mentioned, an initiator sends the commands (requests) to a target, then the target sends a response associated with the command to the initiator. Hence, the commands are sent from the initiator, while the responses are sent by the target.

The command ATR_REQ is sent to a target when an initiator informs the target of its attributes or specifications or when the initiator requests the attributes of the target. The attributes of the initiator or the target includes, for example, transmission rates at which the initiator or the target can send or receive data. The command ATR_REQ includes the attributes of the initiator and the NFCID that identifies the initiator. The target recognizes the attributes and the NFCID of the initiator by receiving the command ATR_REQ.

The response ATR_RES is sent to the initiator as the response to the command ATR_REQ when the target receives the command ATR_REQ. The response ATR_RES mainly includes the attributes or NFCID of the target.

The information on the transmission rates as the attributes included in the command ATR_REQ or the response ATR_RES may include all transmission rates at which the initiator and the targets can transfer data. In this case, the initiator will be able to recognize the transmission rates at which the target can send and receive data by exchanging the command ATR_REQ and the response ATR_RES only once between the initiator and the target. The target can also recognize the transmission rates at which the initiator can send and receive data.

The command WUP_REQ is sent when an initiator selects a target to communicate with. More specifically, targets can be set to a deselect state, in which the transmission of data or response to the initiator is disabled, by sending a command DSL_REQ, which will be discussed hereinafter, from the initiator to the targets. The command WUP_REQ is sent to clear the deselect state to set the targets to the state wherein the targets can send data to the initiator. The command WUP_REQ includes the NFCID of the target whose deselect state is to be cleared. Of the targets that receive the command WUP_REQ, the target specified by the NFCID included in the command WUP_REQ is cleared of its deselect state.

The response WUP_RES is sent in reply to the command WUP_REQ when the target specified by the NFCID included in the command WUP_REQ among the targets that have received the command WUP_REQ is cleared of its deselect state.

The command PSL_REQ is sent when an initiator changes communication parameters for the communication with a target. Communication parameters include, for example, the transmission rates at which data is exchanged between the initiator and the target.

The command PSL_REQ that includes an updated communication parameter value is sent from an initiator to a target. The target receives the command PSL_REQ and updates the communication parameter according to the communication parameter value included in the command PSL_REQ. The target also sends the response PSL_RES in reply to the command PSL_REQ.

The command DEP_REQ is sent when an initiator exchanges data ("real data") with a target, and it includes the data to be sent to the target. The response DEP_RES is sent by the target in response to the command DEP_REQ, and it includes the data to be sent to the initiator. Accordingly, data is sent from the initiator to the target by the command DEP_REQ, and data is sent from the target to the initiator by the response DEP_RES in reply to the command DEP_REQ.

The command DSL_REQ is sent when an initiator sets a target to a deselect state. The target that receives the command DSL_REQ sends the response DSL_RES in reply to the command DSL_REQ and it is set to the deselect state, so that it will no longer respond to or no longer send a response to commands other than the command WUP_REQ.

The command RLS_REQ is sent when an initiator completely finishes the communication with a target. The target that receives the command RLS_REQ sends the response RLS_RES in reply to the command RLS_REQ, and completely ends the communication with the initiator.

The commands DSL_REQ and RLS_REQ both release targets from the communication with an initiator; however, these commands are different in the following aspect. The target released by the command DSL_REQ is set back, by the command WUP_REQ, to the state wherein it is allowed to communicate with the initiator, whereas the target released by the command RLS_REQ is not set to the state wherein it is allowed to communicate with the initiator unless it exchanges the aforementioned polling request frame and the polling response frame with the initiator.

When an initiator sends a command to a certain target, it includes the NFCID of the target, which has been recognized by, for example, exchanging a polling request frame and a polling response frame with the target, and sends the command including the NFCID to the target. When the target receives the command, it sends a response associated with the command to the initiator if the NFCID included in the received command coincides with its own NFCID.

The commands and the responses may be exchanged through, for example, a transport layer.

Figure 13:
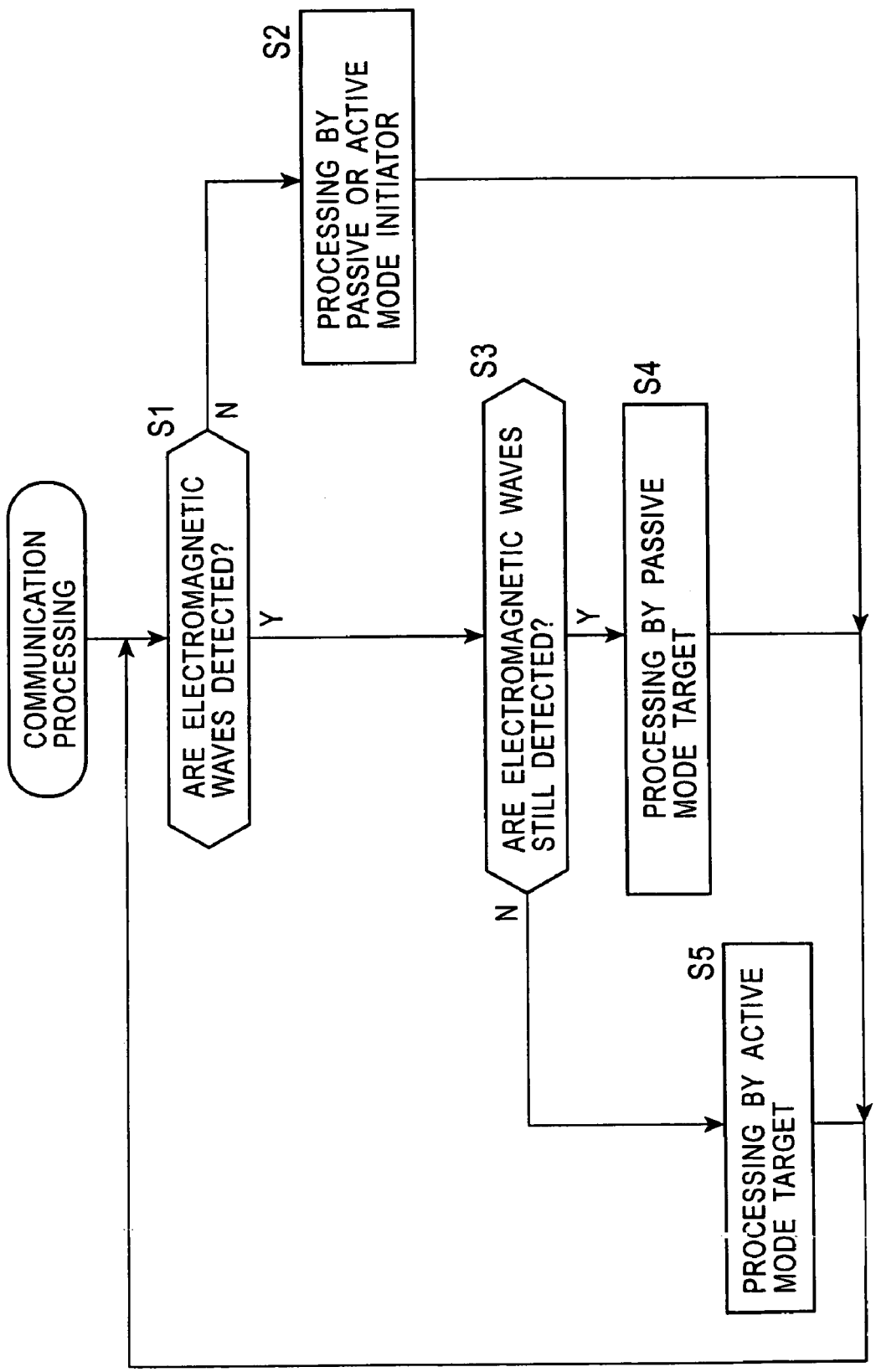
FIG. 13 is a flowchart showing the processing carried out by the NFC apparatuses.

Referring now to the flowchart shown in FIG. 13, the communication processing of an NFC apparatuses will be explained.

Before starting communication, an NFC apparatus first determines in step S1 whether the electromagnetic waves from other apparatus have been detected.

In the NFC apparatus shown in FIG. 4, the controller 21, for example, monitors the level of the electromagnetic waves detected by the detector 23. The electromagnetic waves have the same frequency band or the like as that of the electromagnetic waves used in the NFC apparatus. In step S1, whether the electromagnetic waves from other apparatus are detected or not on the basis of the monitored level.

If it is determined in step S1 that no electromagnetic waves from other apparatus have been detected, then the NFC apparatus proceeds to step S2 wherein the NFC apparatus sets its communication mode to the passive mode or the active mode to carry out the processing of the passive mode initiator or the active mode initiator, which will be discussed later. After the processing, the NFC apparatus returns to step S1 to repeat the same processing thereafter.

In step S2, the communication mode of the NFC apparatus may be set to either the passive mode or the active mode, as mentioned above. However, if a target can be set only to the passive mode as in the case of an IC card in an existing IC card system, then it is required to set the communication mode of the NFC apparatus to the passive mode in step S2 and to carry out the processing for the passive mode initiator.

If it is determined in step S1 that the electromagnetic waves from other apparatus have been detected, that is, the electromagnetic waves of other apparatus have been detected around the NFC apparatus, then the NFC apparatus proceeds to step S3 wherein the NFC apparatus determines whether the electromagnetic waves detected in step S1 are still being detected.

If it is determined in step S3 that the electromagnetic waves are still being detected, then the NFC apparatus proceeds to step S4 wherein the NFC apparatus sets the communication mode to the passive mode to carry out the processing for the passive mode target, which will be discussed later. The case where the electromagnetic waves continue to be detected takes place when, for example, other apparatus near the NFC apparatus becomes a passive mode initiator and continues to output electromagnetic waves by the initial RFCA processing. The NFC apparatus becomes the passive mode target and carries out the processing. After the completion of the processing, the NFC apparatus returns to step S1 to repeat the same processing thereafter.

If it is determined in step S3 that the electromagnetic waves are no longer detected, then the NFC apparatus proceeds to step S5 wherein the NFC apparatus sets the communication mode to the active mode to perform the processing for the active mode target, which will be discussed hereinafter. The case where no electromagnetic waves are detected takes place when, for example, other apparatus near the NFC apparatus becomes an active mode initiator and starts outputting the electromagnetic waves by the initial RFCA processing, then stops the output of the electromagnetic waves thereafter. Hence, the NFC apparatus becomes an active mode target and carries out the processing. After the completion of the processing, the NFC apparatus returns to step S1 to repeat the same processing thereafter.

Referring now to the flowchart shown in FIG. 14, the processing for a passive mode initiator carried out by an NFC apparatus will be explained.

In the processing for the passive mode initiator, the NFC apparatus first starts radiating electromagnetic waves in step S11. Step S11 in the processing for the passive mode initiator is implemented if no electromagnetic waves are detected in step S1 shown in FIG. 13 mentioned above. In other words, the NFC apparatus begins outputting electromagnetic waves in step S11 if no electromagnetic waves are detected in step S1 of FIG. 13. Accordingly, the processing in steps S1 and S11 correspond to the aforesaid initial RFCA processing.

Then, the NFC apparatus proceeds to step S12 wherein the NFC apparatus sets a variable n indicating transmission rate to, for example 1 as the initial value, then proceeds to step S13. In step S13, the NFC apparatus sends a polling request frame at an n-th transmission rate (hereinafter referred to "the n-th rate" as appropriate), then proceeds to step S14. In step S14, the NFC apparatus determines whether a polling response frame has been sent at the n-th rate from other apparatus.

If it is determined in step S14 that no polling response frame has been sent from other apparatus, that is, if, for example, other apparatus near the NFC apparatus cannot perform communication at the n-th rate and the polling response frame is not returned in reply to the polling request frame sent at the n-th rate, or if no other apparatuses exist around the NFC apparatus, then the NFC apparatus proceeds to step S20, skipping steps S15 through S19.

If it is determined in step S14 that a polling response frame has been sent at the n-th rate from other apparatus, that is, if, for example, other apparatus near the NFC apparatus is capable of communication at the n-th rate and returns the polling response frame in reply to the polling request frame sent at the n-th rate, then the NFC apparatus proceeds to step S15 wherein the NFC apparatus determines whether the polling response frame from other apparatus has been properly received. If it is determined in step S15 that the polling response frame from other apparatus has not been properly received, that is, if, for example, a plurality of apparatuses exist around the NFC apparatus and the plural apparatuses have sent the polling response frames in the same time slot with a resultant collision, preventing the NFC apparatus from properly receiving the polling response frame, then the NFC apparatus proceeds to step S20, skipping steps S16 through S19.

If it is determined in step S15 that the polling response frame from other apparatus has been properly received, the NFC apparatus proceeds to step S16 wherein the NFC apparatus recognizes the other apparatus that has returned the polling response frame as a passive mode target, recognizes the NFCID of the target by the NFCID included in the polling response frame, and determines whether the NFCID overlaps the NFCID already stored in step S17, which will be discussed later.

If it is determined in step S16 that the NFCID included in the polling response frame received from the other apparatus overlaps the NFCID that has already been stored, then the NFC apparatus proceeds to step S20, skipping steps S17 through S19.

If it is determined in step S16 that the NFCID included in the polling response frame received from the other apparatus does not overlap the NFCID already stored, then NFC apparatus proceeds to step S17 wherein the NFC apparatus stores the NFCID included in the polling response frame from the other apparatus as the NFCID for identifying the target, which is the other apparatus, and also recognizes that the target is capable of communicating at the n-th rate.

If the NFC apparatus recognizes in step S17 the NFCID of the passive mode target and that the target is capable of communicating at the n-th rate, then the NFC apparatus temporarily determines the transmission rate of the communication with the target at the n-th rate and performs communication with the target at the n-th rate unless the transmission rate is changed by the command PSL_REQ.

The NFCID of the target that has been stored in step S17 by the NFC apparatus is erased from the NFC apparatus when, for example, the communication with the target is completely finished.

Thereafter, the NFC apparatus proceeds to step S18 wherein the NFC apparatus sends the command DSL_REQ at the n-th rate to the target (passive mode target) whose NFCID has been stored in step S17 so as to set the target to the deselect state, thereby prohibiting the target from responding to the polling request frames transmitted thereafter. The NFC apparatus then proceeds to step S19.

In step S19, the NFC apparatus receives the response DSL_RES, which is returned in reply to the command DSL_REQ sent in step S18, from the target to be set to the deselect state by the command DSL_REQ, then proceeds to step S20.

In step S20, the NFC apparatus determines whether a predetermined time has passed from the moment the polling request frame was sent at the n-th rate in step S13. The predetermined time in step S20 may be set to zero or more.

If it is determined in step S20 that the predetermined time has not yet passed since the polling request frame was sent at the n-th rate in step S13, then the NFC apparatus returns to step S14 wherein the processing from step S14 through S20 is repeated.

Repeating the processing from step S14 through S20 enables the NFC apparatus to receive the polling response frames sent at the timings of different time slots, as explained in FIG. 11.

If it is determined in step S20 that the predetermined time has passed since the polling request frame was sent at the n-th rate in step S13, then the NFC apparatus proceeds to step S21 wherein the NFC apparatus determines whether the variable n is equal to its maximum value N. If it is determined in step S21 that the variable n is not equal to the maximum value N, that is, the variable n is below the maximum value N, then the NFC apparatus proceeds to step S22 wherein the NFC apparatus increments the variable n by 1 and returns to step S13 to repeat the processing from step S13 through S22 thereafter.

By repeating the processing from step S13 through S22, the NFC apparatus sends polling request frames at the N number of different transmission rates and receives the polling response frames returned at the different transmission rates.

If it is determined in step S21 that the variable n is equal to the maximum value N, that is, if the NFC apparatus sends the polling request frames at the N number of transmission rates and receives the polling response frames returned at the different transmission rates, then the NFC apparatus proceeds to step S23. The NFC apparatus determines in step S23 whether there are any polling response frames that have not been properly received mainly due to simultaneous receipt of the polling response frames sent from a plurality of apparatuses and also determines whether there are any overlapping NFCIDs among the NFCIDs of other apparatuses recognized in step S16.

If it is determined in step S23 that there is a polling response frame that has not been properly received or there are overlapping NFCIDs among the NFCIDs of other apparatuses recognized in step S16, then the NFC apparatus returns to step S12 to repeat the same processing thereafter. Thus, the polling request frames are resent to the apparatuses that have sent the polling response frames not properly received by the initiator or to the apparatuses from which "proper" NFCIDs that can be uniquely identified have not been acquired, including the apparatuses that have sent overlapping NFCIDs.

If it is determined in step S23 that there are no polling response frames not properly received and that there are no overlapping NFCIDs among the NFCIDs of other apparatuses recognized in step S16, then the NFC apparatus proceeds to step S24 wherein the NFC apparatus carries out, as a passive mode initiator, the communication processing, namely, the communication processing of the passive mode initiator. The communication processing of the passive mode initiator will be discussed later.

Upon completion of the communication processing of the passive mode initiator, the NFC apparatus proceeds from step S24 to S25 wherein the NFC apparatus stops the output of electromagnetic waves started in step S11, thus finishing the processing.

Referring now to the flowchart shown in FIG. 15, the processing of the passive mode target carried out by the NFC apparatus will be explained.

In the processing of the passive mode target, first, in step S31, the NFC apparatus sets the variable n indicating transmission rate to, for example, 1 as the initial value, then proceeds to step S32. In step S32, the NFC apparatus determines whether polling request frames have been transmitted at the n-th rate from other apparatuses acting as passive mode initiators.

If it is determined in step S32 that no polling response frames have been sent from the passive mode initiators, that is, if, for example, other apparatus near the NFC apparatus cannot perform communication at the n-th rate and cannot send the polling request frames at the n-th rate, then the NFC apparatus proceeds to step S33 wherein the NFC apparatus determines whether the variable n is equal to its maximum value N. If it is determined in step S33 that the variable n is not equal to the maximum value N, that is, if the variable n is below the maximum value N, then the NFC apparatus proceeds to step S34 wherein the NFC apparatus increments the variable n by 1 and returns to step S32 to repeat the processing from step S32 through S34 thereafter.

If it is determined in step S33 that the variable n is equivalent to the maximum value N, then the NFC apparatus returns to step S31 to repeat the processing from step S31 through S34. In other words, the processing from step S31 through S34 is repeated until the polling request frame sent from the passive mode initiator at one of the N number of different transmission rates is received.

If it is determined in step S32 that the polling request frame from the passive mode initiator has been received, that is, if the NFC apparatus has properly received the polling request frame of the n-th rate, then the NFC apparatus proceeds to step S35. In step S35, the NFC apparatus sets the n-th rate as the transmission rate to be shared with the initiator and also generates its own NFCID by using a random number, then proceeds to step S36. The NFC apparatus transmits the polling response frame that includes its own NFCID at the n-th rate in step S36, then proceeds to step S37.

After the NFC apparatus sends the polling response frame at the n-th rate in step S36, it continues communication at the n-th rate unless changing the transmission rate is instructed by the receipt of the command PSL_REQ from the passive mode initiator.

In step S37, the NFC apparatus determines whether the command DSL_REQ has been sent from the passive mode initiator, and if the determination result is negative, then the NFC apparatus returns to step S31 to repeat the same processing thereafter.

Figure 14:
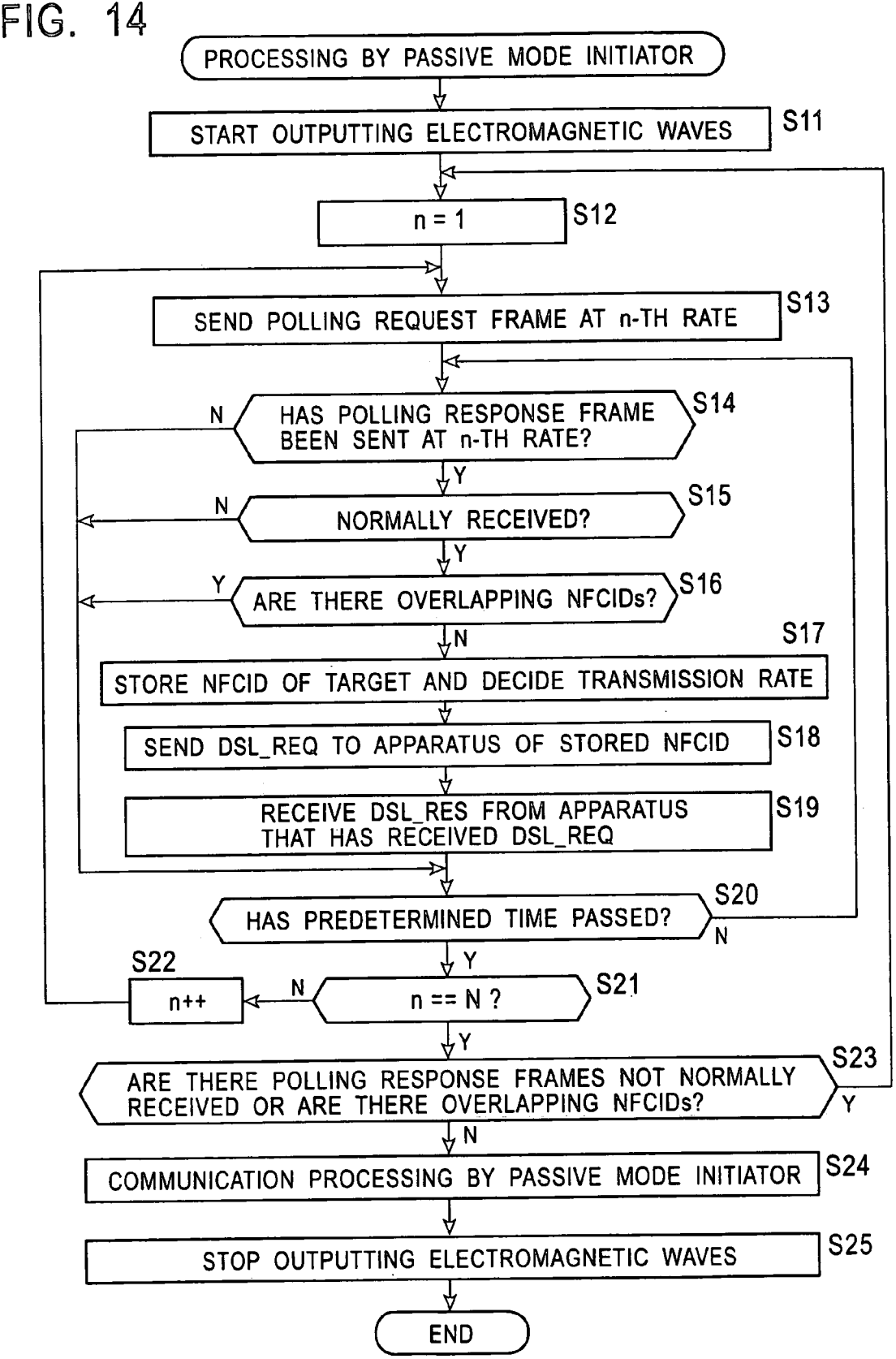
FIG. 14 is a flowchart showing the processing of a passive mode initiator.

More specifically, in the passive mode, if a target sends a polling response frame in reply to the polling request frame sent from the initiator, then the initiator basically sends the command DSL_REQ to the target, as explained in step S18 shown in FIG. 14. The initiator exceptionally does not send the command DSL_REQ to the target if a collision has prevented a polling response frame from being properly received or the NFCID included in a properly received polling response frame overlaps with an NFCID of a target already stored in the initiator, as explained in conjunction with FIG. 14. In short, the initiator does not send the command DSL_REQ, which is to be sent in step S18 shown in FIG. 14, to the target from which a proper NFCID that enables the target to be discriminated from other targets has not been acquired.

Accordingly, if it is determined in step S37 that the command DSL_REQ has not been received, then it means that the initiator has not acquired a proper NFCID of the target NFC apparatus. This causes the NFC apparatus acting as the passive mode target to return from step S37 to S31. In step S31, the same processing described above is repeated. More specifically, the polling request frame resent from the initiator is received, a new NFCID is re-generated using a random number, the new NFCID is included in the polling response frame, and the polling response frame is resent.

If it is determined in step S37 that the command DSL_REQ has been sent from the passive mode initiator, that is, if the NFC apparatus has received the command DSL_REQ, then the NFC apparatus proceeds to step S38. In step S38, the NFC apparatus sends the response DSL_RES in reply to the command DSL_REQ, and the NFC apparatus sets itself to the deselect state, then proceeds to step S39.

In step S39, the NFC apparatus carries out, as the passive mode target, the communication processing of the passive mode target, and upon the completion of the communication processing of the passive mode target, the NFC apparatus ends the processing. The communication processing of the passive mode target will be discussed later.

Referring now to the flowchart shown in FIG. 16, the processing of an active mode initiator carried out by an NFC apparatus will be explained.

From steps S51 through S64 in the processing of the active mode initiator, the same processing as that carried out in steps S11 through S24 in the processing of the passive mode initiator shown in FIG. 14 is implemented. They are different, however, in that the NFC apparatus continues radiating electromagnetic waves until the processing is terminated in the processing of the passive mode initiator shown in FIG. 14, whereas the NFC apparatus radiates electromagnetic waves only when sending data in the processing of the active mode initiator.

More specifically, the NFC apparatus begins the output of electromagnetic waves in step S51. Step S51 in the processing of the active mode initiator is carried out when no electromagnetic waves are detected in the aforementioned step S1 in FIG. 13. If no electromagnetic waves are detected in step S1 shown in FIG. 13, the NFC apparatus starts emitting electromagnetic waves in step S51. Thus, the processing of steps S1 and S51 corresponds to the initial RFCA processing described above.

Thereafter, the NFC apparatus proceeds to step S52 wherein the NFC apparatus sets the variable n indicating the transmission rate to, for example, 1 as the initial value, then proceeds to step S53. The NFC apparatus sends a polling request frame at the n-th rate in step S53 and stops radiating electromagnetic waves (hereinafter referred to as "RF off processing" as appropriate), then proceeds to step S54.

In step S53, the NFC apparatus begins the output of electromagnetic waves by the aforesaid active RFCA processing before sending the polling request frame. However, if the processing of step S53 is implemented first in the processing of the active mode initiator shown in FIG. 16, then it means that the output of electromagnetic waves has already begun by the initial RFCA processing that corresponds to the processing of step S1 shown in FIG. 13 and S51 shown in FIG. 16, so that it is unnecessary to carry out the active RFCA processing.

In step S54, the NFC apparatus determines whether the polling response frame has been sent at the n-th rate from other apparatus.

If it is determined in step S54 that the polling response frame has not been sent from other apparatus, that is, if, for example, other apparatus near the NFC apparatus cannot perform communication at the n-th rate or no other apparatuses exist around the NFC apparatus and therefore no polling response frames are returned in reply to the polling request frame sent at the n-th rate, then the NFC apparatus proceeds to step S60, skipping steps S55 through S59.

If it is determined in step S54 that a polling response frame has been sent at the n-th rate from other apparatus, that is, if, for example, other apparatus near the NFC apparatus is capable of communication at the n-th rate and returns the polling response frame in reply to the polling request frame sent at the n-th rate, then the NFC apparatus proceeds to step S55 wherein the NFC apparatus determines whether the polling response frame from other apparatus has been properly received. If it is determined in step S55 that the polling response frame from other apparatus has not been properly received, that is, if, for example, a plurality of apparatuses exist around the NFC apparatus and the plural apparatuses have sent the polling response frames in the same time slot with a resultant collision, preventing the NFC apparatus from properly receiving the polling response frame, then the NFC apparatus proceeds to step S60, skipping steps S56 through S59.

If it is determined in step S55 that the polling response frame from other apparatus has been properly received, then the NFC apparatus proceeds to step S56 wherein the NFC apparatus recognizes the other apparatus that has returned the polling response frame as an active mode target, recognizes the NFCID of the target by the NFCID included in the polling response frame, and determines whether the NFCID overlaps the NFCID already stored in step S57, which will be discussed later.

If it is determined in step S56 that the NFCID included in the polling response frame received from the other apparatus overlaps the NFCID that has already been stored, then the NFC apparatus proceeds to step S60, skipping steps S57 through S59.

If it is determined in step S56 that the NFCID included in the polling response frame received from the other apparatus does not overlap the NFCID already stored, then NFC apparatus proceeds to step S57 wherein the NFC apparatus stores the NFCID included in the polling response frame from the other apparatus as the NFCID for identifying the target, which is the other apparatus, and also recognizes that the target is capable of communicating at the n-th rate.

If the NFC apparatus recognizes in step S57 the NFCID of the active mode target and that the target is capable of communicating at the n-th rate, then the NFC apparatus determines the transmission rate of the communication with the target at the n-th rate and performs communication with the target at the n-th rate unless the transmission rate is changed by the command PSL_REQ.

The NFCID of the target that has been stored in step S57 by the NFC apparatus is erased from the NFC apparatus when, for example, the communication with the target is completely finished.

Thereafter, the NFC apparatus proceeds to step S58 wherein the NFC apparatus begins radiating electromagnetic waves in the active RFCA processing, and sends the command DSL_REQ at the n-th rate to the target (active mode target) whose NFCID has been stored in step S55. This sets the target to the deselect state, thereby prohibiting the target from responding to the polling request frames transmitted thereafter. After that, the NFC apparatus performs the RF off processing, then proceeds from step S58 to step S59.

In step S59, the NFC apparatus receives the response DSL_RES, which is returned in reply to the command DSL_REQ sent in step S58, from the target to be set to the deselect state by the command DSL_REQ, then proceeds to step S60.

In step S60, the NFC apparatus determines whether a predetermined time has passed from the moment the polling request frame was sent at the n-th rate in step S53.

If it is determined in step S60 that the predetermined time has not yet passed since the polling request frame was sent at the n-th rate in step S53, then the NFC apparatus returns to step S54 wherein the processing from step S54 through S60 is repeated.

If it is determined in step S60 that the predetermined time has passed since the polling request frame was sent at the n-th rate in step S53, then the NFC apparatus proceeds to step S61 wherein the NFC apparatus determines whether the variable n is equal to its maximum value N. If it is determined in step S61 that the variable n is not equal to the maximum value N, that is, the variable n is below the maximum value N, then the NFC apparatus proceeds to step S62 wherein the NFC apparatus increments the variable n by 1 and returns to step S53 to repeat the processing from step S53 through S62 thereafter.

By repeating the processing from step S53 through S62, the NFC apparatus sends polling request frames at the N number of different transmission rates and receives the polling response frames returned at the different transmission rates.

If it is determined in step S61 that the variable n is equal to the maximum value N, that is, if the NFC apparatus sends the polling request frames at the N number of transmission rates and receives the polling response frames returned at the different transmission rates, then the NFC apparatus proceeds to step S63. The NFC apparatus determines in step S63 whether there are any polling response frames that have not been properly received mainly due to simultaneous receipt of the polling response frames sent from a plurality of apparatuses and also determines whether there are any overlapping NFCIDs among the NFCIDs of other apparatuses recognized in step S56.

If it is determined in step S63 that there is a polling response frame that has not been properly received or there are overlapping NFCIDs among the NFCIDs of other apparatuses recognized in step S56, then the NFC apparatus returns to step S52 to repeat the same processing thereafter. Thus, the polling request frames are resent to the apparatuses that have sent the polling response frames not properly received by the initiator or to the apparatuses that have sent overlapping NFCIDs.

If it is determined in step S63 that there are no polling response frames not properly received and that there are no overlapping NFCIDs among the NFCIDs of other apparatuses recognized in step S56, then the NFC apparatus proceeds to step S64 wherein the NFC apparatus carries out, as an active mode initiator, the communication processing, namely, the communication processing of the active mode initiator, and then terminates the processing. The communication processing of the active mode initiator will be discussed later.

Referring now to the flowchart shown in FIG. 17, the processing of the active mode target carried out by the NFC apparatus will be explained.

Figure 15:
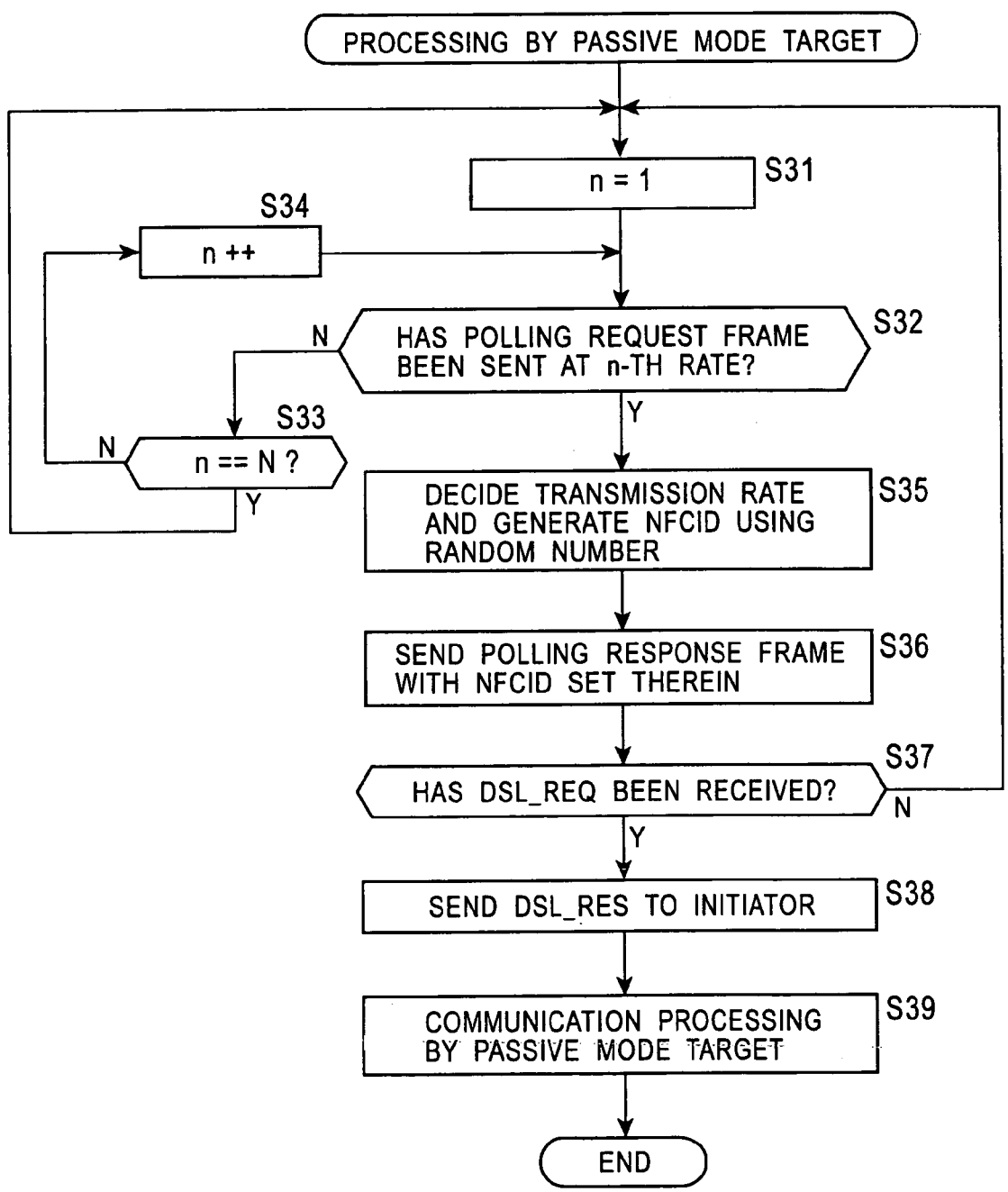
FIG. 15 is a flowchart showing the processing of a passive mode target.

From steps S71 through S79 in the processing of the active mode target, the same processing as that carried out in steps S31 through S39 in the processing of the passive mode target shown in FIG. 15 is implemented. They are different, however, in that the NFC apparatus sends data by load-modulating the electromagnetic waves output from the passive mode initiator in the processing of the passive mode target shown in FIG. 15, while the NFC apparatus sends data by outputting electromagnetic waves by itself in the processing of the active mode target.

In other words, in steps S71 through S75 in the processing of the active mode target, the same processing as that of steps S31 through S35 shown in FIG. 15 is carried out.

After the processing of step S75, the NFC apparatus proceeds to step S76 wherein the NFC apparatus begins outputting electromagnetic waves by the active RFCA processing, and sends the polling response frame that includes its own NFCID at the n-th rate. Furthermore, the NFC apparatus performs the RF off processing in step S76 and then proceeds to step S77.

After sending the polling response frame at the n-th rate in step S76, the NFC apparatus continues communication at the n-th rate unless a change of the transmission rate is instructed by the command PSL_REQ sent from the active mode initiator.

In step S77, the NFC apparatus determines whether the command DSL_REQ has been sent from the active mode initiator, and if the determination result is negative, then the NFC apparatus returns to step S71 to repeat the same processing thereafter.

Figure 16:
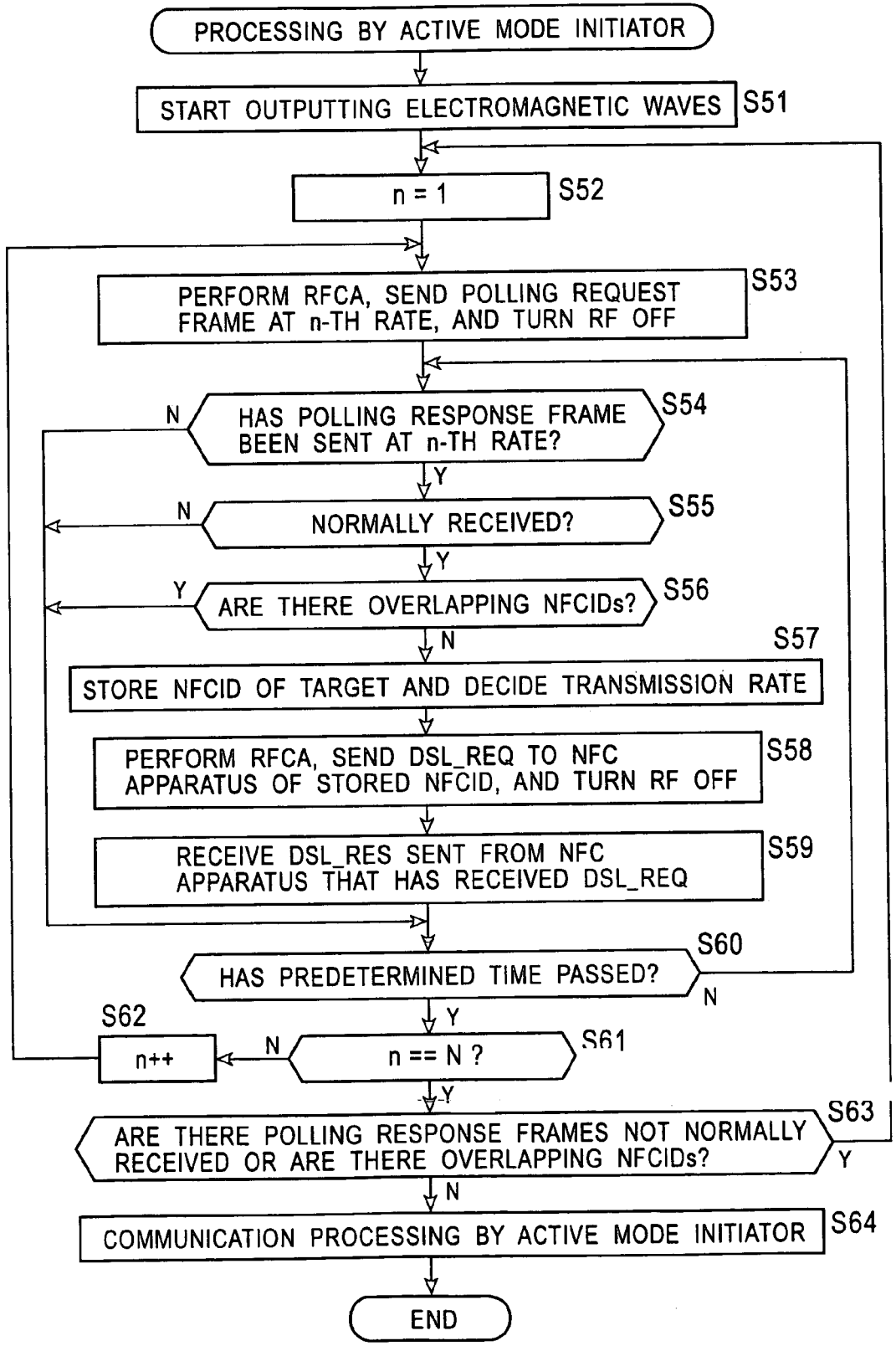
FIG. 16 is a flowchart showing the processing of an active mode initiator.

More specifically, in the active mode, if a target sends a polling response frame in reply to the polling request frame sent from the initiator, then the initiator basically sends the command DSL_REQ to the target, as explained in step S58 shown in FIG. 16. The initiator exceptionally does not send the command DSL_REQ to the target if a collision has prevented a polling response frame from being properly received or the NFCID included in a properly received polling response frame overlaps with an NFCID of a target already stored in the initiator, as explained in conjunction with FIG. 16. In short, the initiator does not send the command DSL_REQ, which is to be sent in step S58 shown in FIG. 16, to the target from which a proper NFCID that enables the target to be discriminated from other targets has not been acquired.

Accordingly, if it is determined in step S77 that the command DSL_REQ has not been received, then it means that the initiator has not acquired a proper NFCID of the target NFC apparatus. This causes the NFC apparatus acting as the active mode target to return from step S77 to S71. In step S71, the same processing described above is repeated. More specifically, the polling request frame resent from the initiator is received, a new NFCID is re-generated using a random number, the new NFCID is included in the polling response frame, and the polling response frame is resent.

If it is determined in step S77 that the command DSL_REQ has been sent from the passive mode initiator, that is, if the NFC apparatus has received the command DSL_REQ, then the NFC apparatus proceeds to step S78. In step S78, the NFC apparatus starts radiating electromagnetic waves by the active RFCA processing and sends the response DSL_RES in reply to the command DSL_REQ, and the NFC apparatus carries out the RF off processing to set itself to the deselect state, then proceeds to step S79.

In step S79, the NFC apparatus carries out, as the active mode target, the communication processing of the active mode target, and upon the completion of the communication processing of the active mode target, the NFC apparatus ends the processing. The communication processing of the active mode target will be discussed later.

Referring now to the flowcharts shown in FIG. 18 and FIG. 19, the communication processing of the passive mode initiator in step S24 shown in FIG. 14 will be explained.

In step S91, the NFC apparatus acting as a passive mode initiator selects the apparatus to communicate with (hereinafter referred to as "the apparatus of interest," as appropriate) from among the targets whose NFCIDs have been stored in step S15 shown in FIG. 14, then proceeds to step S92. In step S92, the NFC apparatus sends the command WUP_REQ to the apparatus of interest so as to clear the deselect state of the apparatus of interest, which had been set to the deselect state by sending the command DSL_REQ in step S19 shown in FIG. 14. This processing will be hereinafter referred to also as "wake-up," as appropriate.

After that, the NFC apparatus waits for the response WUP_RES sent from the apparatus of interest in reply to the command WUP_REQ and proceeds from step S92 to step S93. Upon receipt of the response WUP_RES, the NFC apparatus proceeds to step S94 wherein the NFC apparatus sends the command ART_REQ to the apparatus of interest. The NFC apparatus waits for the response ATR_RES sent from the apparatus of interest in reply to the command ATR_REQ, then proceeds from step S94 to S95 to receive the response ATR_RES.

By exchanging the command ATR_REQ and the response ATR_RES that include their attributes, as described above, the NFC apparatus and the apparatus of interest mutually recognize the transmission rates or the like at which they can communicate with each other.

Thereafter, the NFC apparatus proceeds from step S95 to step S96 wherein the NFC apparatus sends the command DSL_REQ to the apparatus of interest thereby to set the apparatus of interest to the deselect state. The NFC apparatus waits for the response DSL_RES sent from the apparatus of interest in reply to the command DSL_REQ, and proceeds from step S96 to S97 to receive the response DSL_RES. The NFC apparatus then proceeds to step S98.

In step S98, the NFC apparatus determines whether all the targets with their NFCIDs stored in step S17 shown in FIG. 14 have been selected as the apparatuses of interest in step S91. If the NFC apparatus determines in step S98 that there are still targets that have not been selected as the apparatuses of interest, then the NFC apparatus returns to step S91 to select one of the targets that have not yet been selected as the apparatus of interest, and repeats this same processing thereafter.

If the NFC apparatus determines in step S98 that all the targets with their NFCIDs stored in step S17 shown in FIG. 14 have been selected as the apparatuses of interest in step S91, that is, if the NFC apparatus has exchanged the command ATR_REQ and the response ATR_RES with all the targets whose NFCIDs have been stored so as to recognize the transmission rates at which the targets can communicate with the NFC apparatus, then the NFC apparatus proceeds to step S99. In step S99, the NFC apparatus selects the apparatus to communicate with or the apparatus of interest from among the targets with which the NFC apparatus has exchanged the command ATR_REQ and the response ATR_RES in steps S94 and S95, then the NFC apparatus proceeds to step S100.

In step S100, the NFC apparatus sends the command WUP_REQ to the apparatus of interest so as to wake up the apparatus of interest that was set to the deselect state by sending the command DSL_REQ in step S96. The NFC apparatus waits for the response WUP_RES sent from the apparatus of interest in reply to the command WUP_REQ, then proceeds from step S100 to S101 to receive the response WUP_RES, and further proceeds to step S111.

In step S111, the NFC apparatus determines whether communication parameters, including the transmission rate, for performing the communication with the apparatus of interest should be changed.

Figure 18:
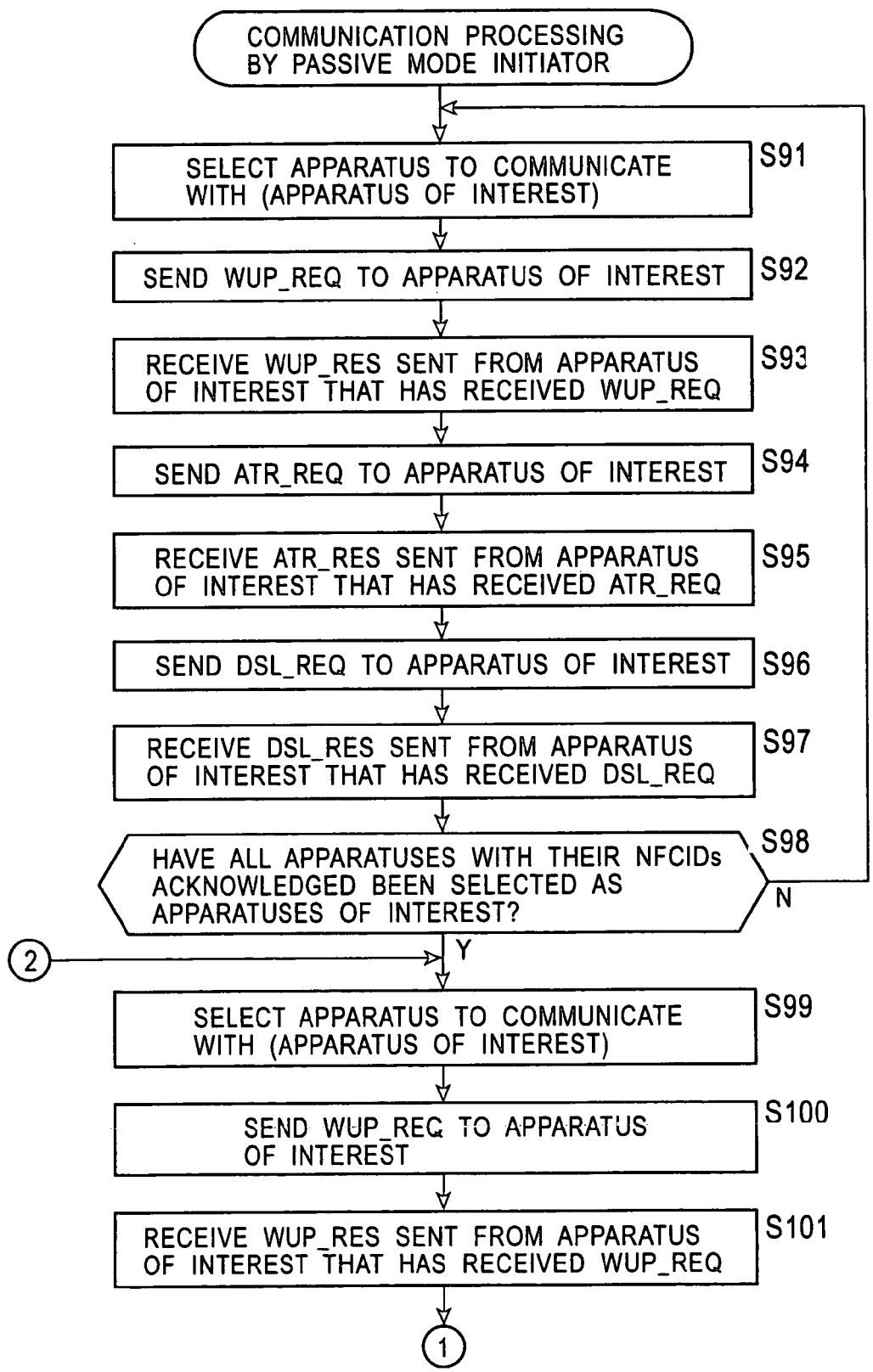
FIG. 18 is a flowchart showing the communication processing carried out by the passive mode initiator.

The NFC apparatus has received the response ATR_RES from the apparatus of interest in step S95 shown in FIG. 18 and recognized the communication parameters, such as the transmission rates, at which the apparatus of interest is capable of performing communication, from the attributes included in the response ATR_RES. If, for example, it is possible to perform communication between the NFC apparatus and the apparatus of interest at a higher transmission rate than a current transmission rate, then the NFC apparatus determines in step S111 that the communication parameters should be changed to change the transmission rate to a higher transmission rate. If, for example, it is possible to perform communication between the NFC apparatus and the apparatus of interest at a lower transmission rate than a current transmission rate and if a current communication environment has a high noise level, then the NFC apparatus determines in step S111 that the communication parameters should be changed to lower the current transmission rate so as to reduce transmission errors. It is possible, however, to continue the communication using the current transmission rate even if the NFC apparatus and the apparatus of interest are capable of communicating at a different transmission rate from the current transmission rate.

In step S111, if the NFC apparatus determines not to change the communication parameters for performing communication with the apparatus of interest, that is, if it determines to continue using the current communication parameters, including the current transmission rate, to carry out the communication between the NFC apparatus and the apparatus of interest, then the NFC apparatus proceeds to step S115, skipping steps S112 and S114.

If the NFC apparatus determines in step S111 to change the communication parameters for performing the communication with the apparatus of interest, then the NFC apparatus proceeds to step S112 wherein the NFC apparatus sets a new communication parameter value in the command PSL_REQ and sends the command to the apparatus of interest. The NFC apparatus waits for the response PLS_RES sent from the apparatus of interest in reply to the command PLS_REQ and proceeds from step S112 to step S113. Upon receipt of the response PSL_RES, the NFC apparatus proceeds to step S114.

In step S114, the NFC apparatus changes the communication parameter, such as a transmission rate, for communicating with the apparatus of interest to the communication parameter value included in the command PSL_REQ sent in step S112. Thereafter, the NFC apparatus carries out the communication with the apparatus of interest according to the communication parameters, including the transmission rate changed in step S114, unless it exchanges the command PSL_REQ and the response PSL_RES with the apparatus of interest again.

By performing the negotiation or exchange of the command PSL_REQ and the response PSL_RES, it is possible to also change, for example, the encoding method of the encoder 16 or the decoder 14 shown in FIG. 4 or the modulation method of the modulator 19 and the load modulator 20 or the demodulator 13, besides the transmission rate.

After that, the NFC apparatus proceeds to step S115 wherein the NFC apparatus determines whether there is any data to be exchanged with the apparatus of interest, and if the determination result is negative, then the NFC apparatus proceeds to step S118, skipping steps S116 and S117.

If the NFC apparatus determines in step S115 that there is data to be exchanged with the apparatus of interest, then the NFC apparatus proceeds to step S116 wherein the NFC apparatus sends the command DEP_REQ to the apparatus of interest. Specifically, in step S116, when data to be sent to the apparatus of interest is found, the NFC apparatus sets the data in the command DEP_REQ and sends it to the apparatus of interest.

The NFC apparatus waits for the response DEP_RES sent from the apparatus of interest in reply to the command DEP_REQ and proceeds from step S116 to step S117. Upon receipt of the response DEP_RES, the NFC apparatus proceeds to step S118.

Thus, exchanging the command DEP_REQ and the response DEP_RES between the NFC apparatus and the apparatus of interest, "actual" data is transferred.

In step S118, the NFC apparatus determines whether to change the communicating party. If the NFC apparatus determines in step S118 not to change the communicating party, that is, if, for example, there is still data to be exchanged with the apparatus of interest, then the NFC apparatus returns to step S111 to repeat the same processing.

If the NFC apparatus determines in step S118 to change the communicating party, that is, if, for example, there is no data to exchange with the apparatus of interest, while there is data to be exchanged with another apparatus, then the NFC apparatus proceeds to step S119 wherein the NFC apparatus sends the command DSL_REQ or RLS_REQ to the apparatus of interest. The NFC apparatus then waits for the response DSL_RES or RLS_RES sent from the apparatus of interest in reply to the command DSL_REQ or RLS_REQ and proceeds from step S119 to step S120 to receive the response DSL_RES or RLS_RES.

As described above, the NFC apparatus sends the command DSL_REQ or RLS_REQ to the apparatus of interest so as to release the target acting as the apparatus of interest from the possible parties for communication with the NFC apparatus acting as the initiator. However, the target that has been released by the command DSL_REQ is set back to be ready for communication with the initiator by the command WUP_REQ, whereas the target released by the command RLS_REQ is not set to be ready for communication with the initiator unless the aforementioned polling request frame and the polling response frame are exchanged with the initiator.

The above case where the command DSL_REQ or RLS_REQ is sent from the initiator to the target is an example wherein a target is released from the possible parties to communicate with the initiator. There is another case where the initiator and the target become too far apart from each other to continue near field communication. If this happens, the target is not set back to be ready for communication with the initiator unless the polling request frame and the polling response frame are exchanged between the target and the initiator, as in the case of the target released by the command RLS_REQ.

The state in which a target is released such that the target remains unavailable for communication with an initiator unless the polling request frame and the polling response frame are exchanged between the target and the initiator will be hereinafter referred to as "completely released," as appropriate. The state in which a target is releases such that the target will be set back to be ready for communication with the initiator by the receipt of the command WUP_REQ from the initiator will be referred to as "temporarily released."

After the processing of step S120, the NFC apparatus proceeds to step S121 wherein the NFC apparatus determines whether all the targets with their NFCIDs stored in step S17 shown in FIG. 14 have been completely released. If the NFC apparatus determines in step S121 that all the targets with their NFCIDs stored have not yet been completely released, then the NFC apparatus returns to step 99 shown in FIG. 18 to select a new apparatus of interest from among the targets that have not been completely released, i.e., the targets that have been temporarily released, and repeats the same processing thereafter.

If it is determined in step S121 that all the targets with their NFCIDs stored have been completely released, then the processing is terminated.

Figure 19:
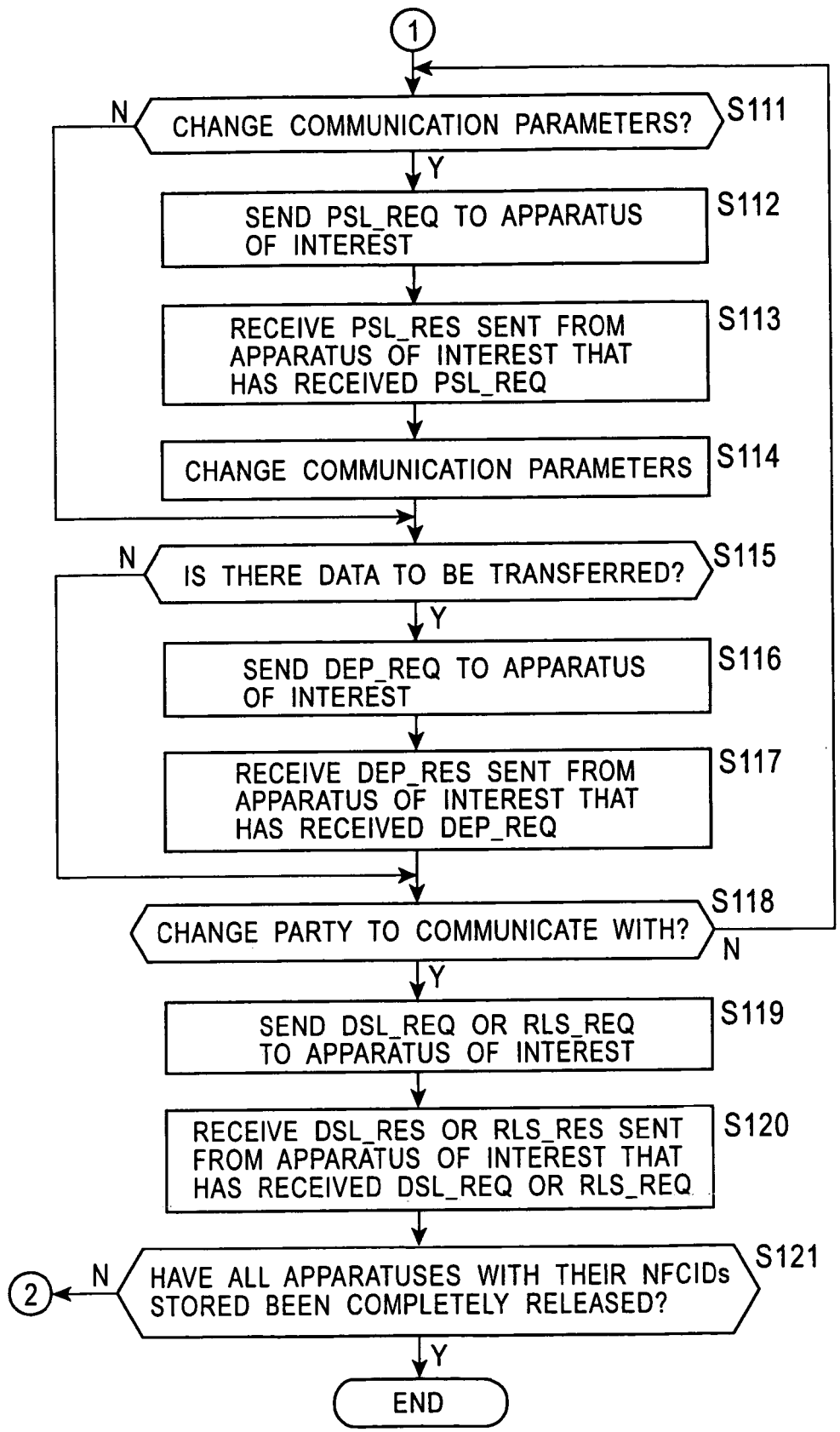
FIG. 19 is another flowchart showing the communication processing carried out by the passive mode initiator.

Data is transferred or exchanged between a target and an initiator by exchanging the command DEP_REQ and the response DEP_RES in steps S116 and S117 shown in FIG. 19. The exchange of the command DEP_REQ and the response DEP_RES is a transaction. After the processing carried out in steps S116 and S117, the NFC apparatus may go back to step S114 via steps S118, S111, S112 and S113, making it possible to change communication parameters. This means that the transmission rate or other communication parameters for the communication between a target and an initiator can be changed for each transaction.

By exchanging the command PSL_REQ and the response PSL_RES between an initiator and a target in steps S112 and S113, it is possible to change the communication mode of the initiator and the target, which is one of the communication parameters, in step S114. Accordingly, the communication mode of the target and the initiator can be changed for each transaction. This means that the communication mode of the target and the initiator must not be changed during a transaction.

Referring now to the flowchart shown in FIG. 20, the communication processing of a passive mode target carried out in step S39 shown in FIG. 15 will be explained.

The NFC apparatus acting as the passive mode target and the passive mode initiator have exchanged the command DSL_REQ and the response DSL_RES in steps S37 and S38 shown in FIG. 15, so that the NFC apparatus acting as the passive mode target is in the deselect state.

In step S131, therefore, the NFC apparatus determines whether the command WUP_REQ has been received from the initiator, and if the determination result is negative, then the NFC apparatus returns to step S131 to remain in the deselect state.

If it is determined in step S131 that the command WUP_REQ has been received from the initiator, that is, if the NFC apparatus receives the command WUP_REQ, then the NFC apparatus proceeds to step S131 to send the response WUP_RES in reply to the command WUP_REQ and wakes up, then proceeds to step S133.

In step S133, the NFC apparatus determines whether the command ATR_REQ has been received from the initiator, and if the determination result is negative, then the NFC apparatus proceeds to step S135, skipping step S134.

If it is determined in step S133 that the command ATR_REQ has been received from the initiator, that is, if the NFC apparatus receives the command ATR_REQ, then the NFC apparatus proceeds to step S135 to send the response ATR_RES in reply to the command ATR_REQ, and further proceeds to step S135.

In step S135, the NFC apparatus determines whether the command DSL_REQ has been received from the initiator. If it is determined in step S135 that the command DSL_REQ has been received from the initiator, that is, if the NFC apparatus has received the command DSL_REQ, then the NFC apparatus proceeds to step S136 wherein it sends the response DSL_RES in reply to the command DSL_REQ, and returns to step S131. This places the NFC apparatus in the deselect state.

If it is determined in step S135 that the command DSL_REQ has not been received from the initiator, then the NFC apparatus proceeds to step S137 wherein the NFC apparatus determines whether the command PSL_REQ has been received from the initiator. If the determination result is negative, then the NFC apparatus proceeds to step S140, skipping steps S138 and S139.

If it is determined in step S137 that the command PSL_REQ has been received from the initiator, that is, if the NFC apparatus receives the command PSL_REQ, then the NFC apparatus proceeds to step S138 to send the response PSL_RES in reply to the command PSL_REQ and proceeds to step S139. In step S139, the NFC apparatus changes the communication parameter according to the command PSL_REQ from the initiator, then proceeds to step S140.

In step S140, the NFC apparatus determines whether the command DEP_REQ has been received from the initiator. If the determination result is negative, then the NFC apparatus proceeds to step S142, skipping step S141.

If it is determined in step S140 that the command DEP_REQ has been received from the initiator, that is, if the NFC apparatus receives the command DEP_REQ, then the NFC apparatus proceeds to step S141 to send the response DEP_RES in reply to the command DEP_REQ and proceeds to step S142.

In step S142, the NFC apparatus determines whether the command RSL_REQ has been received from the initiator. If the determination result is negative, then the NFC apparatus returns to step S133 to repeat the same processing thereafter.

If it is determined in step S142 that the command RSL_REQ has been received from the initiator, that is, if the NFC apparatus receives the command RSL_REQ, then the NFC apparatus proceeds to step S143 to send the response RSL_RES in reply to the command RSL_REQ so as to completely terminate the communication with the initiator, thus ending the processing.

Figure 21:
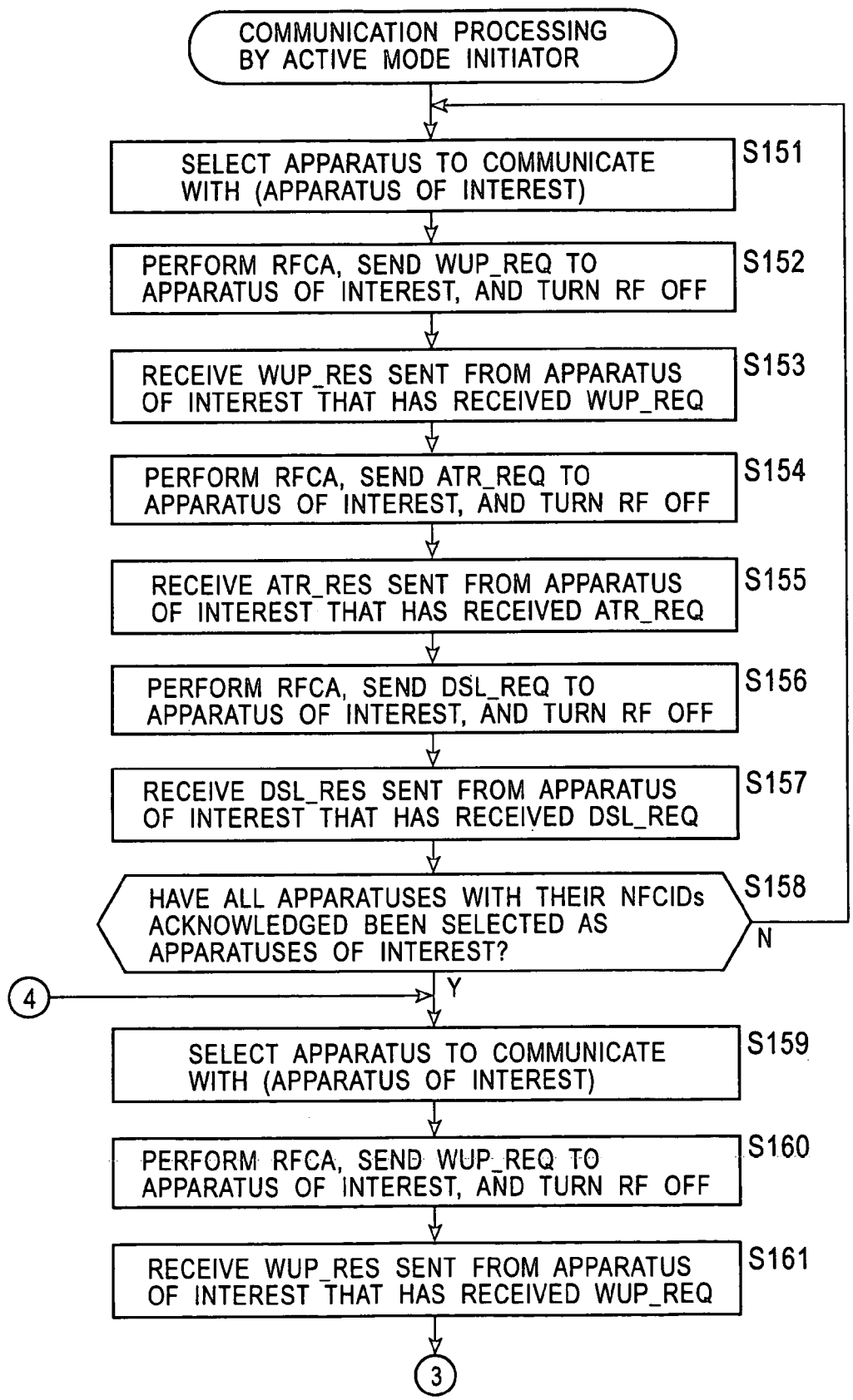
FIG. 21 is a flowchart showing the communication processing carried out by the active mode initiator.
Figure 22:
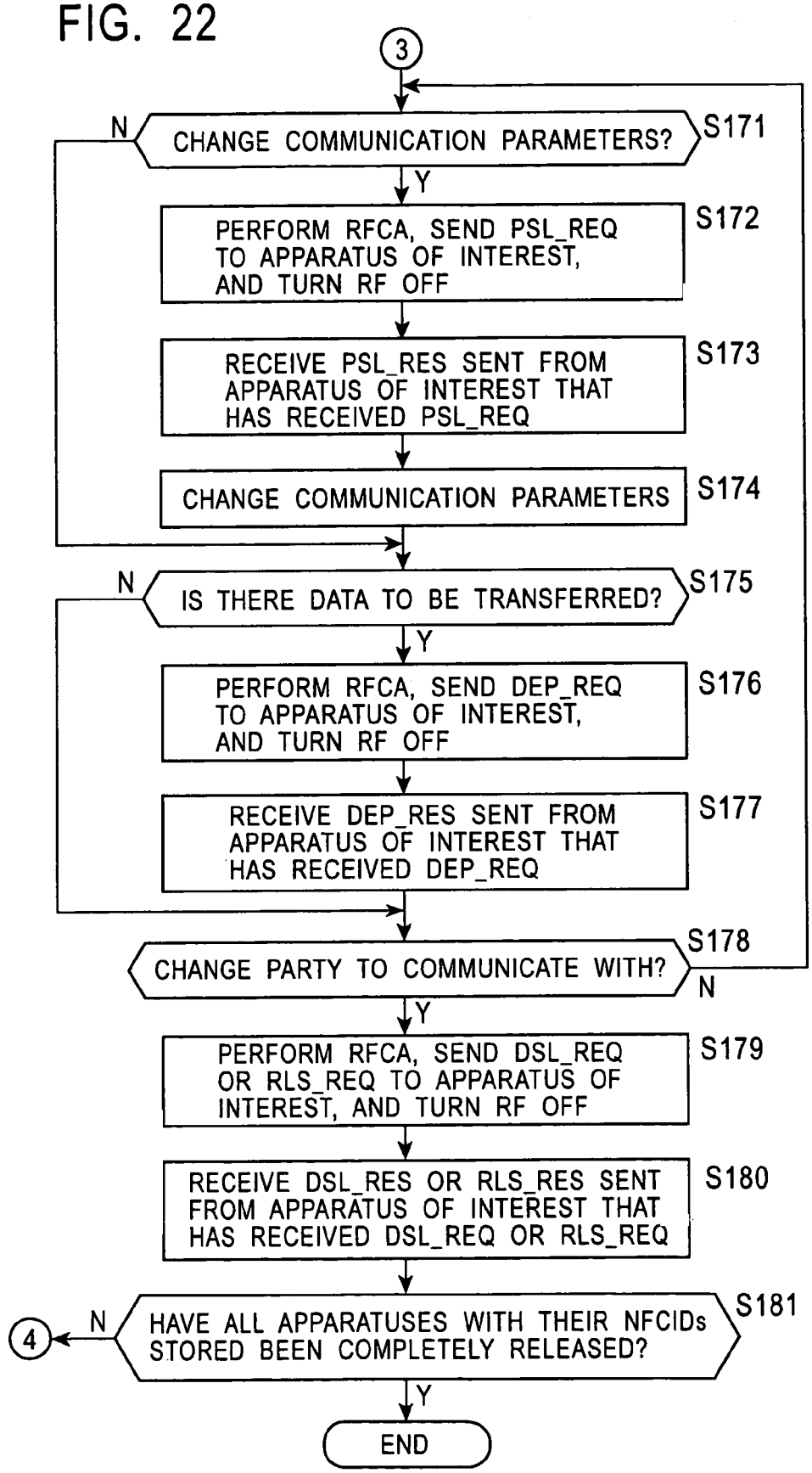
FIG. 22 is another flowchart showing the communication processing carried out by the active mode initiator.

FIGS. 21 and 22 are the flowcharts detailedly showing the communication processing carried out by the active mode initiator in step S64 of FIG. 16.

In the communication processing of the passive mode initiator explained in conjunction with FIGS. 18 and 19, the initiator continues to output electromagnetic waves, whereas in the communication processing of the active mode initiator shown in FIGS. 21 and 22, the initiator carries out the active RFCA processing to begin radiating electromagnetic waves before sending out the command, then stops the output of the electromagnetic waves (the off processing) after completion of the transmission of the command. Except for this aspect, the same processing as that carried out in steps S91 through S101 shown in FIG. 18 and in steps S111 through S121 shown in FIG. 19 is performed in steps S151 through S161 and in steps S171 through S181 shown in FIG. 22 for the communication processing of the active mode initiator shown in FIG. 21, so that the description will be omitted.

Figure 17:
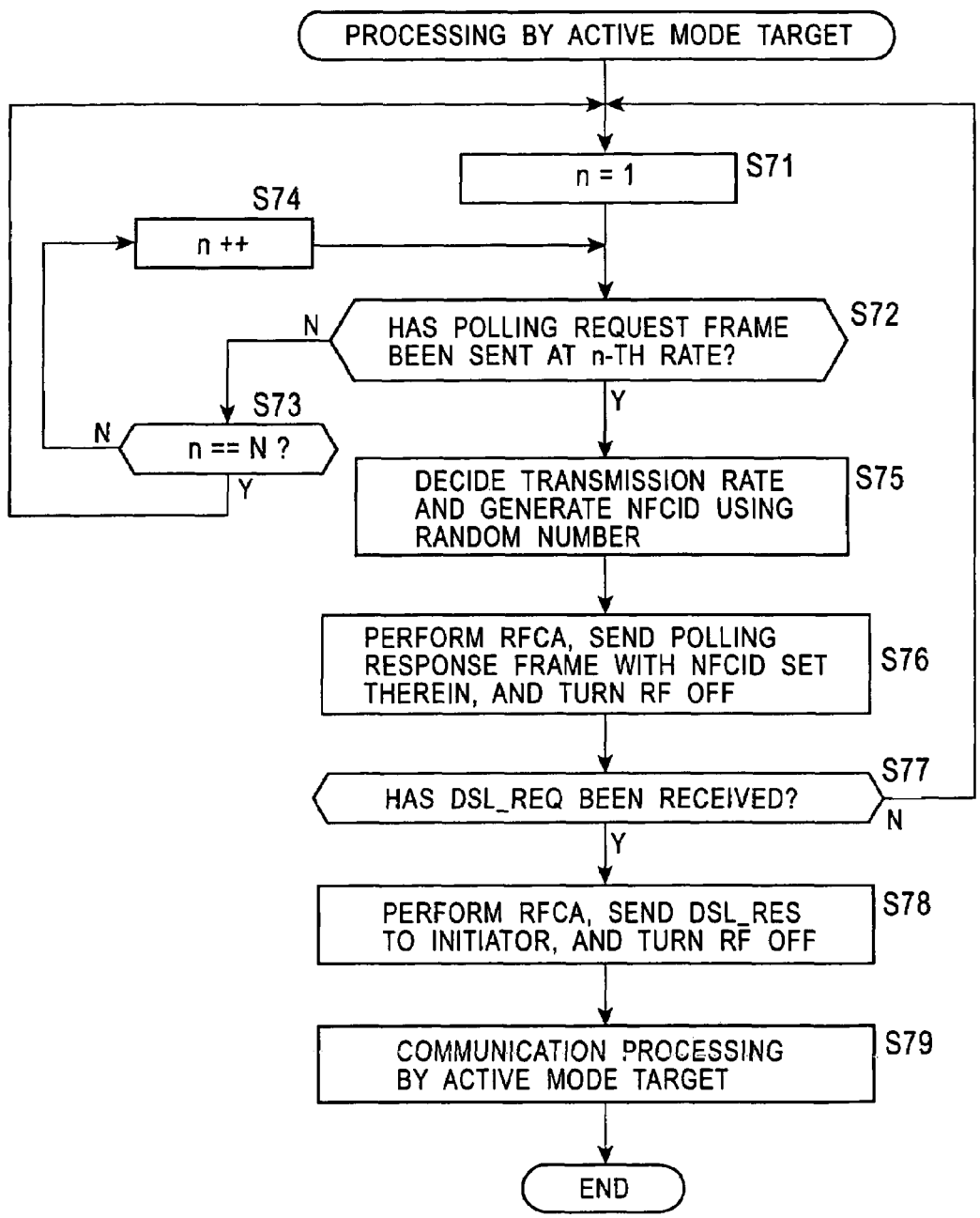
FIG. 17 is a flowchart showing the processing of an active mode target.
Figure 23:
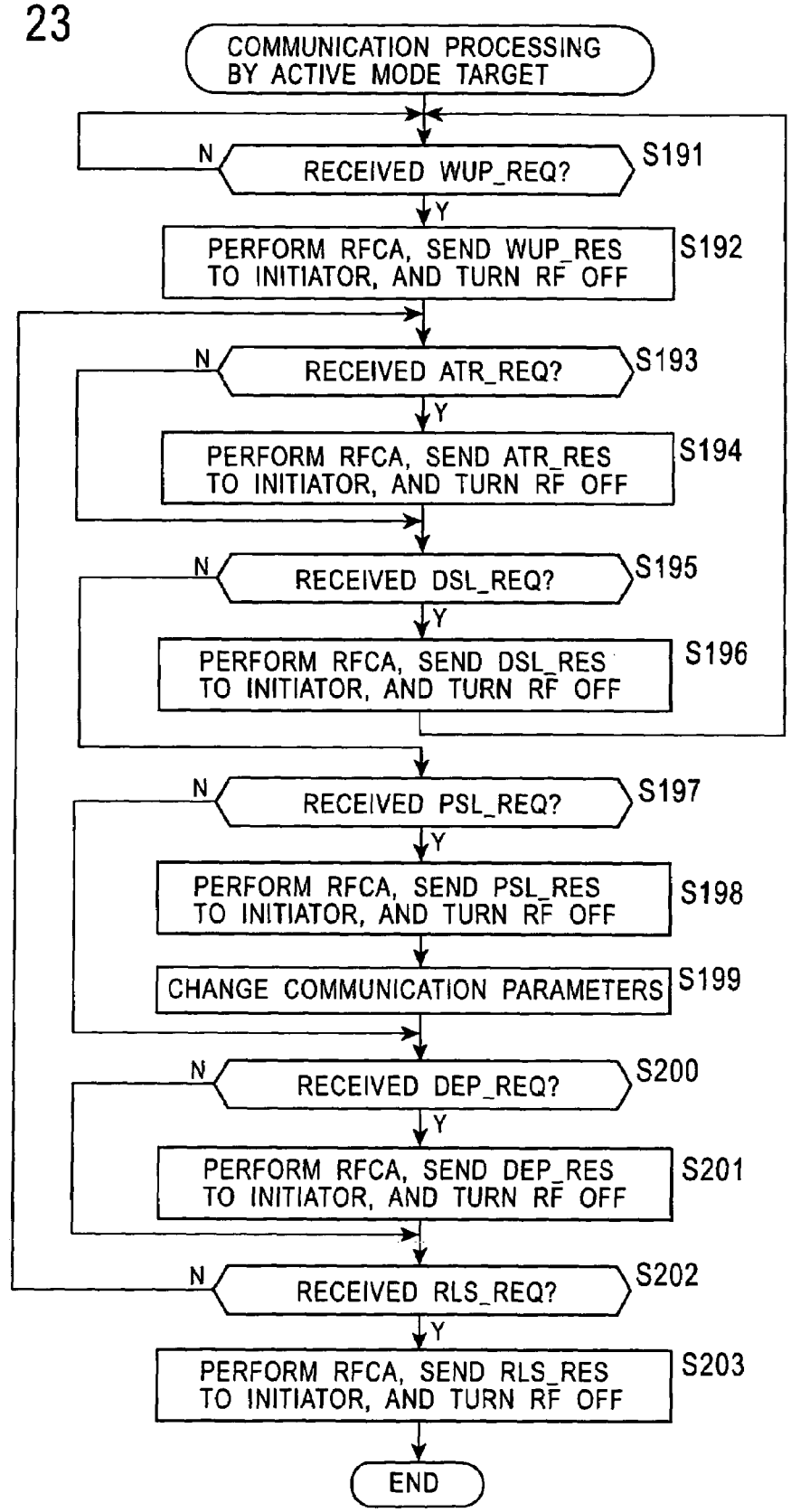
FIG. 23 is a flowchart showing the communication processing carried out by the active mode target.

FIG. 23 is a flowchart detailedly showing the communication processing of the active mode target in step S79 shown in FIG. 17.

Figure 20:
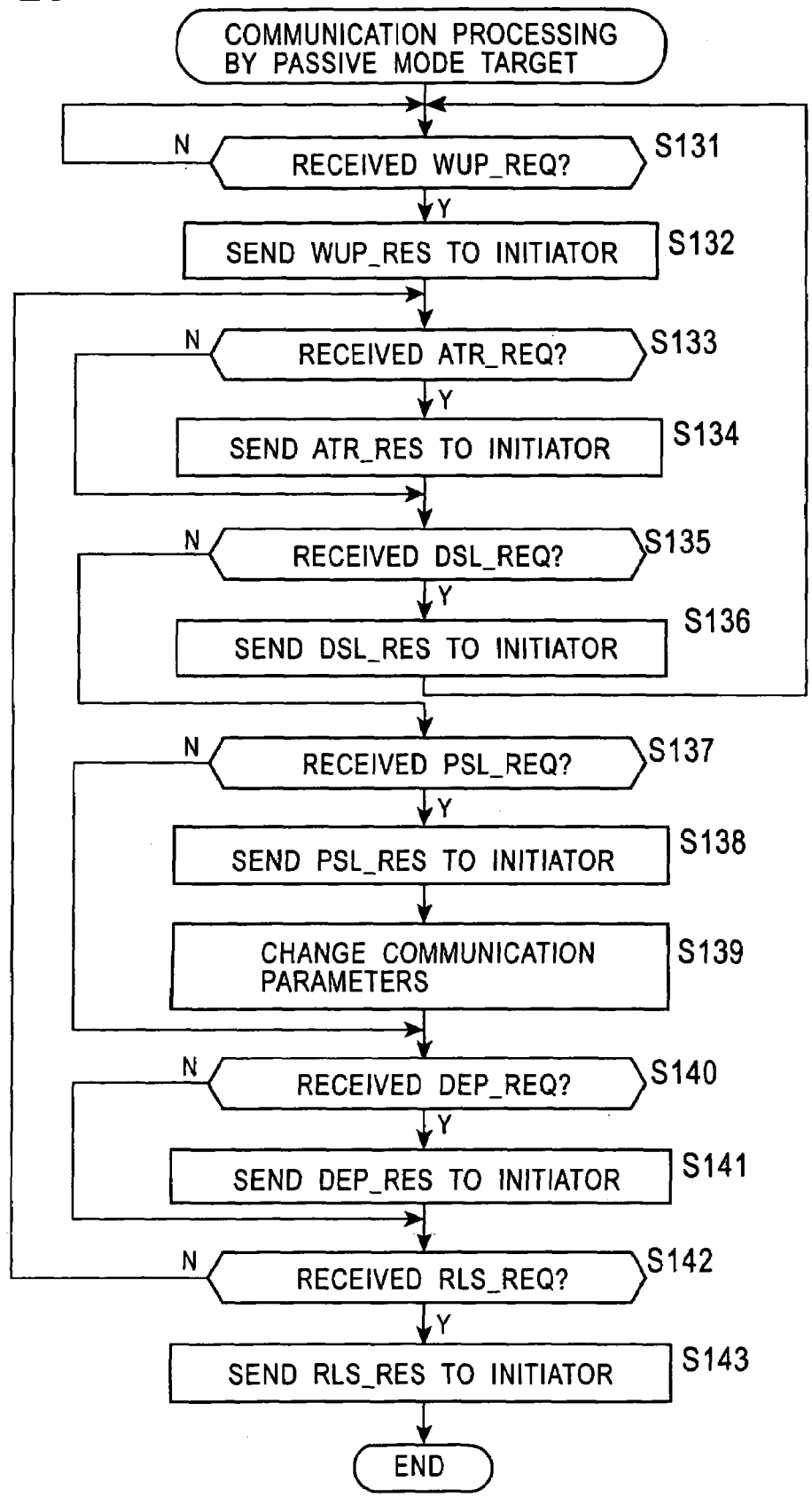
FIG. 20 is a flowchart showing the communication processing carried out by the passive mode target.

In the communication processing of the passive mode target explained in conjunction with FIG. 20, the target sends data by load-modulating the electromagnetic waves emitted by the initiator, whereas in the communication processing of the active mode target shown in FIG. 23, the target carries out the active RFCA processing to begin radiating electromagnetic waves before sending out the command, then stops the output of the electromagnetic waves (the off processing) after completion of the transmission of the command. Except for this aspect, the same processing as that carried out in steps S131 through S143 shown in FIG. 20 is performed in steps S191 through S203 for the communication processing of the active mode target shown in FIG. 23, so that the description will be omitted.

Thus, the initiator sends a polling request frame for requesting the NFCID to identify a target and acquires the NFCID placed in the polling response frame received from the target in reply to the polling request frame. If the NFCID of the target has not been properly received by the initiator, the polling request frame is resent. Upon receipt of the polling request frame from the initiator, the target generates its NFCID using a random number, includes the generated NFCID in the polling response frame, and sends the polling response frame to the initiator. If the target receives the polling request frame again from the initiator, the target re-generates its NFCID by using a random number, includes it in the polling response frame, and resends the polling response frame to the initiator.

Accordingly, if there are a plurality of targets located closely to an initiator, the initiator can acquires a unique NFCID from each of the plural targets to securely identify each of the plural targets by their NFCIDs. This makes it possible to prevent a plurality of targets from simultaneously sending responses in reply to a command sent by the initiator to a target of a particular NFCID.

Furthermore, the NFCIDs are generated using random numbers, thereby obviating the need for providing the apparatuses with EEPROMs for storing the NFCIDs, which would be necessary if fixed unique numbers or the like were used for the NFCIDs. This permits reduced manufacturing cost of the apparatuses.

In the present specification, the processing steps carried out by the NFC apparatuses is not necessarily required to implemented in time series according to the sequence shown by the flowcharts. The processing also includes the one carried out in parallel or separately, such as parallel processing or processing based on objects.

In the embodiment discussed above, when an initiator starts communication with a particular target as the apparatus of interest after acquiring the NFCIDs of all targets located near the initiator, only the apparatus of interest is woken up from the deselect state, while the other targets remain in the deselect state. Alternatively, however, after acquiring the NFCIDs of all the neighboring targets, all the targets may be woken up to perform communication. In this case, the target to which a command is sent from the initiator is identified by the NFCID included in the command. More specifically, the command sent from the initiator is received by the target having the NFCID specified in the command, and the target returns a response in reply to the command.

In the embodiment discussed above, the description has been given of the case where the present invention has been applied to the NFC apparatuses capable of sending and receiving data at a plurality of transmission rates. The present invention, however, can be applied also to communication apparatuses capable of sending and receiving data only at one particular transmission rate. Moreover, the present invention can be also applied to communication apparatuses adapted to perform communication only in either the passive mode or the active mode.

What is claimed is:

1. A communication apparatus for sending and receiving data by electromagnetic waves, comprising:

electromagnetic wave generating means for forming a radio frequency (RF) field by generating electromagnetic waves;

modulating means for sending data at one of a plurality of transmission rates by modulating electromagnetic waves;

demodulating means for demodulating electromagnetic waves so as to acquire data sent from other apparatus at one of the plurality of transmission; and a detector configured to detect a radio frequency field within a first time period before the communication apparatus initiates a communication with other communication apparatus and within a second time period before the communication apparatus responds to a request of said other communication apparatus, the first time period is defined by $T_{IDT}+n \times T_{RFW}$, where $T_{IDT}$ is a first initial delay time, n is a first random number, and $T_{RFW}$ is a first radio frequency waiting time, and said communication apparatus generates a first radio frequency when the radio frequency field is not detected by the detector within the first time period, the second time period is defined by $T_{ADT}+n' \times T_{RFW}$, where $T_{ADT}$ is a second active delay time, n' is a second random number, and $T_{IDT}$ is larger than $T_{ADT}$ and said communication apparatus generates a second radio frequency when the radio frequency field is not detected by the detector within the second time period, wherein data for requesting an identification (ID) to identify the other apparatus is sent, the ID sent from the other apparatus in reply to the request for the ID is acquired, and the ID sent from the other apparatus includes a random number generated in the other apparatus;

data that includes the ID of the other apparatus is sent as the data for the other apparatuses after acquiring the ID of the other apparatus, and data for requesting the ID is sent again if the ID of the other apparatus has not been properly acquired.

2. The communication apparatus according to claim 1, wherein the data for requesting IDs is sent again if the IDs are simultaneously received from a plurality of other apparatuses or if any overlapping IDs are received from the plurality of other apparatuses.

3. A communication method for a communication apparatus for sending and receiving data by electromagnetic waves, comprising:

generating electromagnetic waves to form a radio frequency (RF) field;

modulating electromagnetic waves to send data at one of a plurality of transmission rates;

demodulating electromagnetic waves to acquire data transmitted from other apparatus at one of the plurality of transmission rates;

detecting a radio frequency field within a first time period before the communication apparatus initiates a communication with other communication apparatus and within a second time period before the communication apparatus responds to a request of said other communication apparatus, wherein the first time period is defined by $T_{IDT}+n \times T_{RFW}$, where $T_{IDT}$ is a first initial delay time, n is a first random number, and $T_{RFW}$ is a first radio frequency waiting time, and said communication apparatus generates a first radio frequency when the radio frequency field is not detected by the detector within the first time period, and the second time period is defined by $T_{ADT}+n' \times T_{RFW}$, where $T_{ADT}$ is a second active delay time, n' is a second random number, and $T_{IDT}$ is larger than $T_{ADT}$ and said communication apparatus generates a second radio frequency when the radio frequency field is not detected by the detector within the second time period;

sending data for requesting identification (ID) to identify the other apparatus;

acquiring the ID sent from the other apparatus in reply to the request for the ID, wherein the ID sent from the other apparatus includes a random number generated in the other apparatus;

sending data that includes the ID of the other apparatus as the data for the other apparatus after acquiring the ID of the other apparatus; and sending data for requesting the ID again if the ID of the other apparatus has not been properly acquired.

4. A communication apparatus for sending and receiving data by electromagnetic waves, comprising:

modulating means for modulating electromagnetic waves to send data at any one of a plurality of transmission rates;

demodulating means for demodulating electromagnetic waves to acquire data sent from other apparatus at any one of the plurality of transmission rates; and a detector configured to detect a radio frequency field within a time period before the communication apparatus responds to a request of said other apparatus, wherein the time period is defined by $T_{ADT}+n' \times T_{RFW}$, where $T_{ADT}$ is an initial delay time, n' is a random number, and $T_{RFW}$ is a radio frequency waiting time;

said communication apparatus is configured to send, when an active communication mode is initiated, a response to said other apparatus by emitting an electromagnetic wave that prevents the other apparatus from starting an emission of electromagnetic waves to a plurality of target devices at the same time;

said communication apparatus is configured to send, when a passive communication mode is initiated, a response from the communication apparatus to said other apparatus at a timing determined by a random number, the response including an identification (ID) to identify said communication apparatus, wherein, when data for requesting the ID for identifying itself is received from the other apparatus, its ID is generated using a random number and the generated ID is sent, when data for requesting the ID is received again from the other apparatus, its ID is generated again by using a random number and the re-generated ID is sent again, and data that includes the ID of itself among the data sent from the other apparatus is received as the data for itself.

5. The communication apparatus according to claim 4, further comprising electromagnetic wave generating means for forming an RF field by generating electromagnetic waves, wherein the modulating means sends data by modulating the electromagnetic waves output from the electromagnetic wave generating means.

6. The communication apparatus according to claim 4, wherein the modulating means sends data by load-modulating the electromagnetic waves generated by the other apparatus.

7. A communication method for a communication apparatus for sending and receiving data by electromagnetic waves, comprising:

modulating electromagnetic waves to send data at one of a plurality of transmission rates;

demodulating electromagnetic waves to acquire data sent from other apparatus at one of the plurality of transmission rates;

detecting a radio frequency field within a time period before the communication apparatus responds to a request of said other communication apparatus, wherein the time period is defined by $T_{ADT}+n' \times T_{RFW}$, where $T_{ADT}$ is an initial delay time, n' is a random number, and $T_{RFW}$ is a radio frequency waiting time;

sending, when an active communication mode is initiated, a response to said other communication apparatus by emitting an electromagnetic wave that prevents the other communication apparatus from starting an emission of electromagnetic waves to a plurality of target devices at the same time;

sending, when a passive communication mode is initiated, a response from the communication apparatus to said other communication apparatus at a timing determined by a random number, the response including an identification (ID) to identify said communication apparatus;

receiving data for requesting the ID for identifying itself from the other apparatus, and generating the ID by using a random number and transmitting the generated ID, when data for requesting ID is received again from the other apparatus, its ID is re-generated by using a random number and the re-generated ID is transmitted again, and data that includes its ID among the data sent from the other apparatus is received as the data for itself.

8. A method of performing near-field communication between an initiator device and a target device, wherein the initiator device sends a command to the target device for starting the communication with a first electromagnetic wave modulated by data, the method comprising:

detecting at the initiator device a presence of a radio frequency field;

emitting the first electromagnetic wave from the initiator device to the target device, the first electromagnetic wave being configured to carry a request, when a radio frequency field is not detected within a time period defined by $T_{IDT}+n \times T_{RFW}$, where $T_{IDT}$ is an initial delay time, n is a random number, and $T_{RFW}$ is a radio frequency waiting time;

initiating communication with the target device selectively in one of an active mode and a passive mode of communication, wherein (1) when the active communication mode is initiated, there are a plurality of target devices which receive the command and the radio frequency field is not detected in the detecting step within a time period defined by $T_{ADT}+n' \times T_{RFW}$, where TADT is an active delay time, n' is a random number, and $T_{IDT} > T_{ADT}$, the initiator device detects a response from the target device through a second electromagnetic wave emitted by the target device to avoid starting the emission of electromagnetic wave by different target devices at the same time, and (2) when the passive communication mode is initiated and there are a plurality of target devices which receive the command, the initiator device detects a response from the target device including an identification (ID) determined by a random number generated in the target device; and resending the command to the target device when a collision of responses from a plurality of target devices occurs.

9. A method of performing near-field communication between an initiator device and a target device, wherein the initiator device is capable of initiating communication with the target device selectively in one of an active mode and a passive mode of communication and the target device responds to a command from the initiator device for starting communication with a first electromagnetic wave modulated by data, the method comprising:

(1) when the active communication mode is initiated and there are a plurality of target devices which receive the command:

detecting at the target device a presence of a radio frequency field, when the radio frequency yield is not detected in said detecting step within a time period defined by $T_{ADT}+n'T_{RFW}$, where $T_{ADT}$ is an active delay time n' is a random number, and $T_{RFW}$ is a radio frequency waiting time, sending a response to the initiator device by emitting from the target device a second electromagnetic wave to avoid starting the emission of electromagnetic waves by a plurality of target devices at the same time; and when the passive communication mode is initiated and where there are a plurality of target devices which receive the command:

sending a response from the target device to the initiator device at a timing determined by a random number, the response including an identification (ID) to identify the respective target device.

10. A communication apparatus for near-field wireless communications at a specified carrier frequency, the communication apparatus being configured to operate in active and passive communication modes and comprising:

a transmitter configured to generate a radio frequency field by generating carrier electromagnetic waves;

a modulator configured to transmit data by modulating the carrier electromagnetic waves in accordance with the data;

a detector configured to detect a presence of a radio frequency field; and a controller arranged to configure the transmitter, modulator and detector such that:

(a) when the communication apparatus initiates an active or passive communication mode with another communication apparatus the detector is configured to detect a presence of a radio frequency field within a first time period defined by $T_{IDT}+n \times T_{RFW}$, where $T_{IDT}$ is an initial delay time, n is a random number, and $T_{RFW}$ a radio frequency waiting time, the transmitter is configured to generate a radio frequency when a radio frequency field is not detected by the detector within the first time period, and the modulator is configured to transmit a request to start communication with the another communication apparatus via the radio frequency field at one of a predetermined transfer rates, and (b) when the communication apparatus responds to a request for initiation of an active communication mode by another communication apparatus the detector is configured to detect a presence of a radio frequency field within a second time period defined by $T_{ADT}+n' \times T_{RFW}$, where $T_{ADT}$ is an active delay time, n' is a random number, and $T_{IDT} > T_{ADT}$, the transmitter is configured to generate a radio frequency field when a radio frequency field is not detected by the detect in the second time period, and the modulator is configured to modulate the carrier electromagnetic device waves with a data signal to be transmitted to said another communication apparatus and to transmit a response to the request for initiation from the another communication apparatus via the radio frequency-field; and (c) when the communication apparatus receives a request for initiation of a passive communication mode from another communication apparatus the transmitter is configured to send a response to the request transmitted from the said another communication apparatus, the response including an identification (ID) determined by a random number generated in the communication apparatus to identify the communication apparatus.

* * * * *

UNITED STATES PATENT AND TRADEMARK OFFICE
CERTIFICATE OF CORRECTION

| | |
|---|---|
| PATENT NO. | : 7,209,706 B2 |
| APPLICATION NO. | : 10/715447 |
| DATED | : April 24, 2007 |
| INVENTOR(S) | : Kunihide Fujii et al. |

It is certified that error appears in the above-identified patent and that said Letters Patent is hereby corrected as shown below:

Column 30, line 51, after "transmission" insert --rates--.

Column 33, line 32, change "TADT" to --$T_{ADT}$--.

Signed and Sealed this

Thirtieth Day of October, 2007

JON W. DUDAS
*Director of the United States Patent and Trademark Office*